(12) United States Patent
Chen et al.

(10) Patent No.: US 11,979,868 B2
(45) Date of Patent: May 7, 2024

(54) CONTROL INFORMATION SENDING METHOD AND DETECTING METHOD, BASE STATION, TERMINAL, AND STORAGE MEDIUM

(71) Applicant: ZTE CORPORATION, Guangdong (CN)

(72) Inventors: Yijian Chen, Shenzhen (CN); Zhaohua Lu, Shenzhen (CN); YuNgok Li, Shenzhen (CN); Hao Wu, Shenzhen (CN); Peng Hao, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 215 days.

(21) Appl. No.: 17/175,683

(22) Filed: Feb. 14, 2021

(65) Prior Publication Data

US 2021/0185656 A1 Jun. 17, 2021

Related U.S. Application Data

(63) Continuation of application No. 16/301,195, filed as application No. PCT/CN2017/082781 on May 2, 2017, now Pat. No. 10,966,204.

(30) Foreign Application Priority Data

May 13, 2016 (CN) .......................... 201610323309.3

(51) Int. Cl.
*H04W 72/04* (2023.01)
*H04L 5/00* (2006.01)
*H04L 27/00* (2006.01)
*H04W 16/14* (2009.01)
*H04W 72/044* (2023.01)

(52) U.S. Cl.
CPC ......... *H04W 72/046* (2013.01); *H04L 5/0042* (2013.01); *H04L 5/0046* (2013.01);
(Continued)

(58) Field of Classification Search
CPC ... H04W 72/046; H04W 16/14; H04W 72/04; H04L 5/0042; H04L 27/0014; H04L 2027/0095
See application file for complete search history.

(56) References Cited

U.S. PATENT DOCUMENTS

2012/0294204 A1* 11/2012 Chen ..................... H04L 5/0053 370/280
2014/0198737 A1* 7/2014 Papasakellariou .......................... H04W 72/0446 370/329

(Continued)

FOREIGN PATENT DOCUMENTS

| CN | 101222260 A | 7/2008 |
| CN | 101242216 A | 8/2008 |

(Continued)

OTHER PUBLICATIONS

WIPO, International Search Report dated Jul. 21, 2017 corresponding to application No. PCT/CN2017/082781, 2pgs.

(Continued)

*Primary Examiner* — Brenda H Pham
(74) *Attorney, Agent, or Firm* — Li & Cai Intellectual Property (USA) Office

(57) ABSTRACT

Disclosed are a control information sending method and detecting method, a base station, a terminal, and a computer storage medium. The method includes: a base station determining first-type physical layer control information, which is used for indicating a first-type control parameter of a second-type physical layer control channel; determining second-type physical layer control information, which is used for indicating a second-type control parameter of a data channel; sending the first-type physical layer control infor- (Continued)

mation; and sending the second-type physical layer control information on the second-type physical layer control channel.

17 Claims, 12 Drawing Sheets

(52) U.S. Cl.
CPC ......... *H04L 27/0014* (2013.01); *H04W 16/14* (2013.01); *H04W 72/04* (2013.01); *H04L 2027/0095* (2013.01)

(56) References Cited

U.S. PATENT DOCUMENTS

| | | | | |
|---|---|---|---|---|
| 2015/0003353 | A1* | 1/2015 | Yang | H04L 1/18 370/329 |
| 2015/0173052 | A1* | 6/2015 | Zhang | H04L 5/0053 370/329 |
| 2016/0080051 | A1 | 3/2016 | Sajadieh et al. | |

FOREIGN PATENT DOCUMENTS

| | | |
|---|---|---|
| CN | 101356746 A | 1/2009 |
| CN | 101640582 A | 2/2010 |
| CN | 102573094 A | 7/2012 |
| CN | 102752070 A | 10/2012 |
| CN | 104641569 A | 5/2015 |
| CN | 104796185 A | 7/2015 |
| CN | 105119643 A | 12/2015 |
| CN | 105122667 A | 12/2015 |
| WO | WO 2016056955 A1 | 4/2016 |

OTHER PUBLICATIONS

WIPO, English translation of the Written Opinion of the International Search Authority in the international application No. PCT/CN2017/082781, dated Jul. 21, 2017, 6pgs.

China Patent Office, First Office Action dated Apr. 7, 2021 regarding CN201610323309.3 and the English translation thereof.

* cited by examiner

A: beam is not aligned after a transceiver moves

B: LOS path blocking a b

CONTROL INFORMATION SENDING METHOD AND DETECTING METHOD, BASE STATION, TERMINAL, AND STORAGE MEDIUM

CROSS-REFERENCE TO RELATED APPLICATIONS

The present application is a continuation of U.S. patent application Ser. No. 16/301,195, filed on Nov. 13, 2018, which is based upon and claims benefit of Chinese Patent Application No. 201610323309.3, filed on May 13, 2016, the contents of these applications are hereby incorporated by reference in their entirety.

TECHNICAL FIELD

The disclosure relates to wireless communication technologies, and in particular to a method for sending control information, a method for detecting control information, a base station, a terminal, and a computer storage medium.

BACKGROUND

In a wireless communication system, the link reliability of a physical layer is a very important issue. A deterioration in physical link quality may cause different levels of system performance degradation. In general, a transmission success rate, at the physical layer, of a link at the level of a data channel should be guaranteed at about 90%. For example, when calculating and reporting a Channel Quality Indication (CQI), an appropriate modulation and coding scheme is selected according to a target block error rate about 0.9. If a data block is not correctly transmitted during the actual transmission, a terminal needs to feed back NACK to a base station, and the base station performs retransmission according to the feedback of the terminal, and may initiate multiple retransmissions for the data block that is not correctly transmitted, so as to improve the final success rate of the data block. In addition to a physical layer retransmission technology, it is also possible to initiate retransmission of a larger data block on a high layer. For a control channel, the link reliability requirements are very high, and physical control information generally has no retransmission mechanism. The one-time transmission accuracy rate of the physical control information generally needs to reach 99%, and the transmission success rate of some pieces of more important control information reaches 99.9% or even higher, so as to avoid severe degrading of some system performances caused by the loss of control information, for example, indication information of a physical control channel symbols carried by a Physical Control Format Indicator Channel (PCFICH).

In a low-frequency system, such as a fourth generation (4G) Long Term Evolution (LTE) system, a multi-antenna closed-loop beamforming technology may be commonly used in data channels to obtain high transmission throughput. However, the characteristic of the beamforming technology is that energy is very concentrated in space. Although the performance is very good when the beam direction is accurate, the performance is degraded once the beam direction is inaccurate. In particular, a beam formed in a large-scale antenna system is very narrow. Although high gain is obtained when beams with very concentrated energy aligned, the performance will be severely degraded when the beam is slightly deviated, and even a signal may not be received completely. The data channel is characterized by emphasis on transmission efficiency and bad robustness. However, since a control channel performs some adjustments for dynamically indicating a data channel transmission policy, adjustment to a wide beam or beam switching may be quickly performed in this case, so that it does not cause particularly serious impact. Further, the target block error rate of the data channel itself is not very demanding, and retransmission may also be performed, so there are no serious problems.

For a control channel, in a low-frequency LTE system, a physical control channel generally adopts a relatively robust transmission mechanism, and does not rely on feedback of Channel State Information (CSI). For example, a Physical Downlink Control Channel (PDCCH) of LTE adopts a diversity transmission scheme, such as, space frequency block coding (SFBC), or a combination of SFBC and frequency switch transmit diversity (FSTD), which has high robustness and low-order modulation coding, thereby further ensuring high robustness. Therefore, the low-frequency system may work well, there is no frequent problem that a communication link is suddenly broken, and control information and data information cannot be parsed at all.

However, as the number of antennas increases, the coverage of data channel can be greatly enhanced due to the use of Beamforming. However, for the control channel, since the robustness is guaranteed by using a wide beam or a diversity technology (such as SFBC), there is a clear problem of coverage asymmetry. In order to solve this problem, a very low code rate may be required for control channel transmission, which means lower control information transmission efficiency. For a high-frequency system, this problem will be very obvious because the high-frequency coverage is originally a big problem, which needs to use the Beamforming gain of large-scale antennas to resist a large path loss. Therefore, the control channel also considers beamforming transmission through a certain width of beam using channel state information, which means that the control channel also needs to support a closed-loop Multiple-Input Multiple-Output (MIMO) transmission technology.

If the control channel supports MIMO transmission, resource utilization efficiency and coverage will be significantly improved, but the robustness of a link will be difficult to guarantee. In the low-frequency LTE system, if there is a problem with the data link, the control channel is generally robust. The data link may be restored by making some adjustments to the data transmission through the control channel. However, if the control channel also uses MIMO transmission, once the beam is not aligned, e.g., in the case where a terminal moves and a line of sight (LOS) path physically blocks a current transmission beam, the overall link breaking will be caused, thereby resulting in the severe degradation of system performance. For example, if the beam cannot be aligned, uplink CSI cannot be correctly fed back, downlink control and data will not be accurate, and an uplink control channel will be lost. In this case, uplink and downlink data and control links will be broken, and link restoration and reconstruction cannot be quickly performed. The case where the beam cannot be aligned or blocked may be as illustrated in FIG. 1.

In a high-frequency system, when large-scale antennas are applied, an MIMO technology is used for both control and data channels in the related art, so the problem described above is always existed. Once the beam cannot be aligned or blocked, downlink control, downlink data, uplink control and uplink data are all broken. If there is downlink data to be sent at this time, the terminal does not receive control information and even cannot receive data, and no feedback is given. The terminal may understand that there is no information to be sent. In this case, the terminal has been lost from the network, and the terminal is not even aware of the loss of the link. The terminal will mistakenly believe that there is no data transmission on the downlink.

SUMMARY

In view of this, embodiments of the disclosure are directed to provide a method for sending control information, a method for detecting control information, a base station, a terminal, and a computer storage medium.

The technical solutions of the embodiments of the disclosure are implemented as follows.

An embodiment of the disclosure provides a method for sending control information. The method includes the following operations.

A base station determines first-type physical layer control information, the first-type physical layer control information being indicative of a first-type control parameter of a second-type physical layer control channel.

Second-type physical layer control information is determined, the second-type physical layer control information being indicative of a second-type control parameter of a data channel.

The first-type physical layer control information is sent.

The second-type physical layer control information is sent on the second-type physical layer control channel.

An embodiment of the disclosure also provides a method for detecting control information. The method includes the following operations.

First-type physical layer control information is determined, the first-type physical layer control information being indicative of a first-type control parameter of a second-type physical layer control channel.

Second-type physical layer control information is received or detected on the second-type physical layer control channel according to the first-type physical layer control information.

An embodiment of the disclosure also provides a base station. The base station includes: a first determining unit, a first sending unit and a second sending unit.

The first determining unit is configured to determine first-type physical layer control information, the first-type physical layer control information being indicative of a first-type control parameter of a second-type physical layer control channel, and further configured to determine second-type physical layer control information, the second-type physical layer control information being indicative of a second-type control parameter of a data channel.

The first sending unit is configured to send the first-type physical layer control information determined by the first determining unit.

The second sending unit is configured to send the second-type physical layer control information determined by the first determining unit on the second-type physical layer control channel.

An embodiment of the disclosure also provides a terminal. The terminal includes: a second determining unit and a receiving and detecting unit.

The second determining unit is configured to determine first-type physical layer control information, the first-type physical layer control information being indicative of a first-type control parameter of a second-type physical layer control channel.

The receiving and detecting unit is configured to receive or detect second-type physical layer control information on the second-type physical layer control channel according to the first-type physical layer control information determined by the second determining unit.

An embodiment of the disclosure also provides a method for sending control information. The method includes the following operations.

N types of control channels are determined, where N is an integer greater than or equal to 1.

Configuration information of the N types of control channels is determined.

The configuration information is configured for a receiving end.

Control information is sent through the N types of control channels.

An embodiment of the disclosure also provides a method for detecting control information. The method includes the following operations.

Configuration information of N types of control channels is determined, where N is an integer greater than or equal to 1.

Control information is received or detected on the N types of control channels according to the configuration information.

An embodiment of the disclosure also provides a base station. The base station includes: a first determining unit, a configuration unit and a sending unit.

The first determining unit is configured to determine N types of control channels, where N is an integer greater than or equal to 1.

The configuration unit is configured to determine configuration information of the N types of control channels.

The sending unit is configured to configure the configuration information determined by the configuration unit for a receiving end, and send control information through the N types of control channels.

An embodiment of the disclosure also provides a terminal. The terminal includes: a second determining unit and a receiving and detecting unit.

The second determining unit is configured to determine configuration information of N types of control channels, where N is an integer greater than or equal to 1.

The receiving and detecting unit is configured to receive or detect control information on the N types of control channels according to the configuration information determined by the second determining unit.

An embodiment of the disclosure also provides a computer storage medium. The computer storage medium includes a set of instructions, when the instructions are executed, at least one processor is triggered to perform the foregoing method for sending control information, or perform the foregoing method for detecting control information.

The embodiments of the disclosure provide a method for sending control information and a method for detecting control information, a base station, a terminal and a computer storage medium. On one hand, a base station determines first-type physical layer control information, the first-type physical layer control information being indicative of a first-type control parameter of a second-type physical layer control channel; the base station determines second-type physical layer control information, the second-type physical layer control information being indicative of a second-type control parameter of a data channel; the base station sends the first-type physical layer control information; and the base station sends the second-type physical layer control information on the second-type physical layer control channel. A receiving end determines first-type physical layer control information, the first-type physical layer control information being indicative of a first-type control parameter of a second-type physical layer control channel; and the receiving end receives or detects second-type physical layer control information on the second-type physical layer control channel according to the first-type physical layer control information. By adopting the technical solution of the embodiment of the disclosure, the robustness of a control channel adopting MIMO transmission is guaranteed by adding control information (first-type physical layer control information), thereby solving the problem in the related art of severe degradation of system performance caused by overall link breaking once a beam cannot be aligned or blocked.

On the other hand, a sending end determines N types of control channels, where N is an integer greater than or equal to 1; the sending end determines configuration information of the N types of control channels; the sending end configures the configuration information for the receiving end; and the sending end sends control information through the N types of control channels. The receiving end determines the configuration information of the N types of control channels, where N is an integer greater than or equal to 1; and the receiving end receives or detects control information on the N types of control channels according to the configuration information. Thus, according to the technical solution of the present embodiment, configuration information of N types of control channels is configured to make the transmission of one or more types of control channels more robust, and the transmission efficiency of other types of control channels is higher, thereby guaranteeing the robustness of a control channel adopting MIMO transmission, thereby solving the problem in the related art of severe degradation of system performance caused by overall link breaking once a beam cannot be aligned or blocked.

BRIEF DESCRIPTION OF DRAWINGS

In the drawings, which are not necessarily to scale, similar reference numerals may describe similar components in different views. The similar reference numerals with different letter suffixes may indicate different examples of similar components. The drawings generally illustrate various embodiments discussed herein by way of example and not limitation.

DETAILED DESCRIPTION

The disclosure will be further described in detail below with reference to the accompanying drawings and specific embodiments.

First Embodiment

Figure 1:
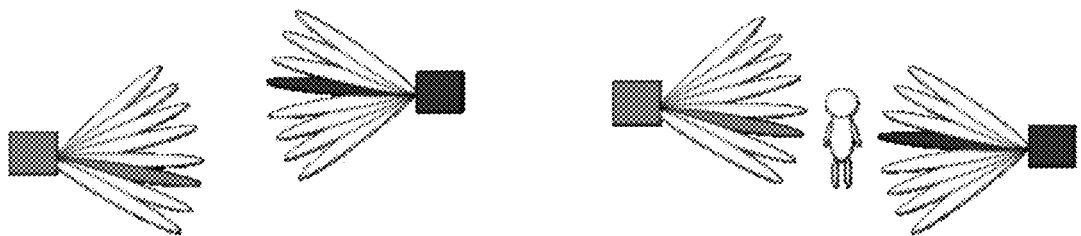
FIG. 1 is a schematic diagram of beam misalignment and beam blocking at a transceiver end.
Figure 2:
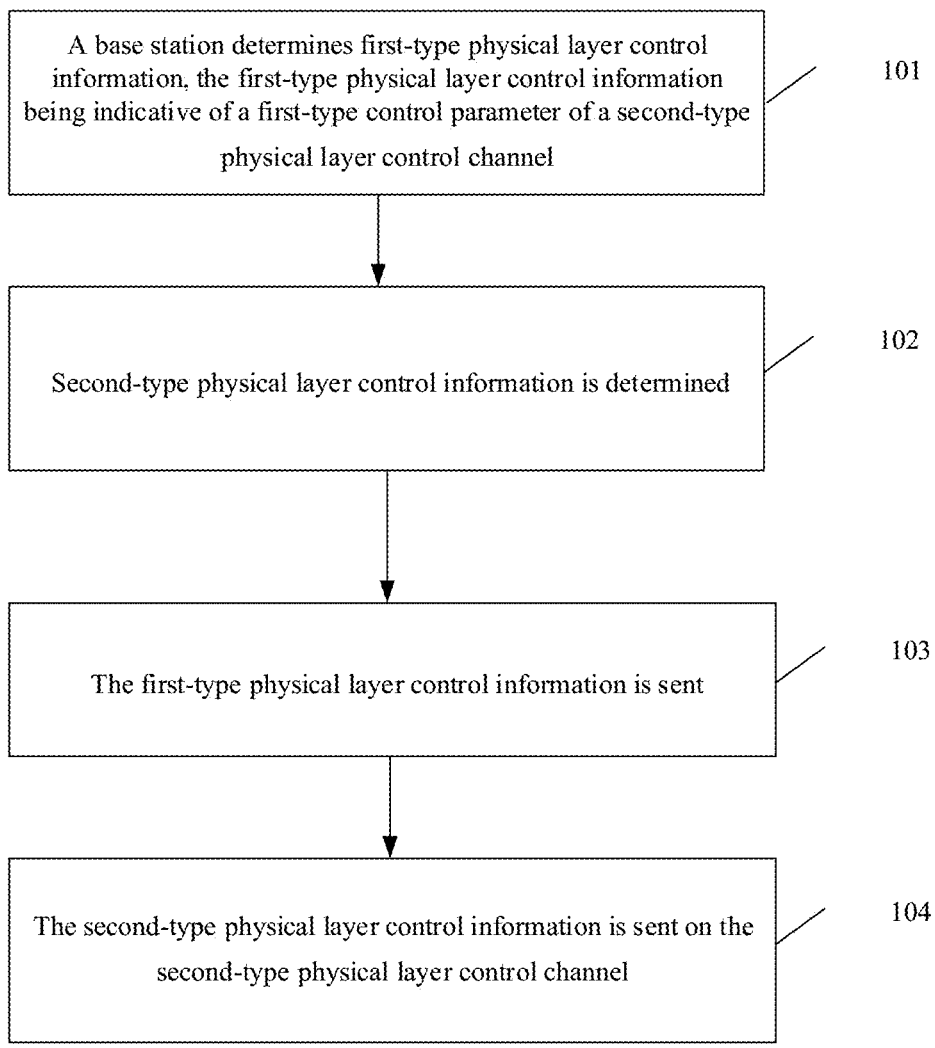
FIG. 2 is a first schematic flowchart of a method for sending control information according to an embodiment of the disclosure.

The embodiment of the disclosure provides a method for sending control information. FIG. 2 is a first schematic flowchart of a method for sending control information according to an embodiment of the disclosure. As illustrated in FIG. 2, the method for sending control information includes the operations as follows.

At operation 101, a base station determines first-type physical layer control information, the first-type physical layer control information being indicative of a first-type control parameter of a second-type physical layer control channel.

At operation 102, second-type physical layer control information is determined, the second-type physical layer control information being indicative of a second-type control parameter of a data channel.

At operation 103, the first-type physical layer control information is sent.

At operation 104, the second-type physical layer control information is sent on the second-type physical layer control channel.

Figure 3:
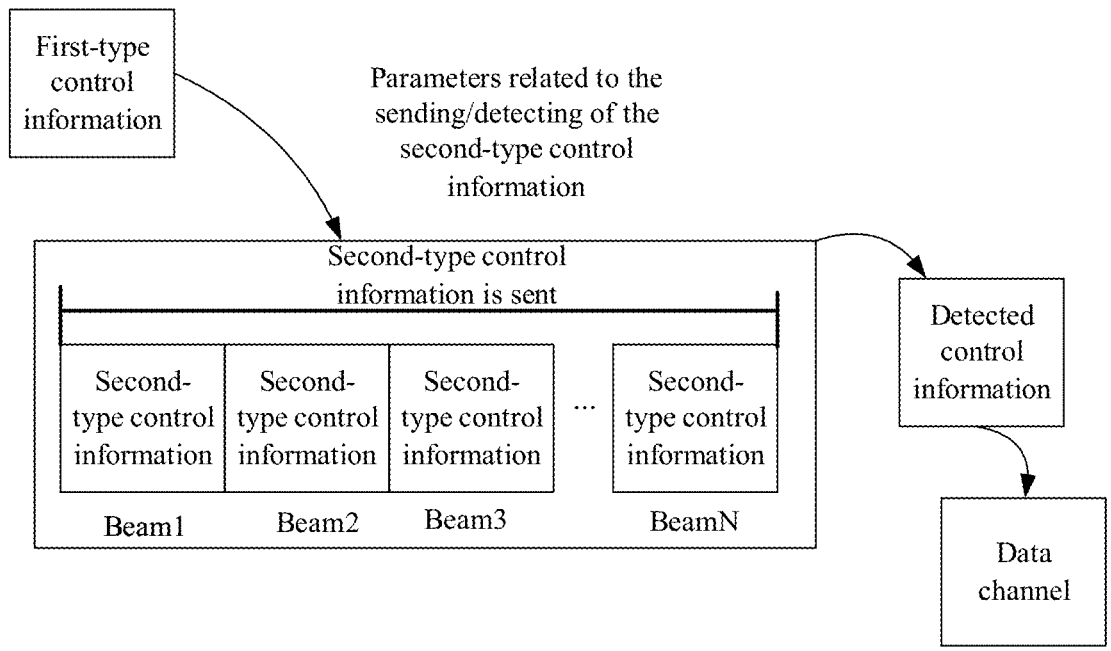
FIG. 3 to FIG. 12 are schematic diagrams showing applications of first-type physical layer control information in embodiments of the disclosure.

In the control information sending method of the present embodiment, as illustrated in FIG. 3, the robustness of a control channel using MIMO transmission is guaranteed by adding first-level control information, especially in a situation where MIMO uses radio frequency precoding and baseband precoding to perform beamforming.

In the present embodiment, the first-type physical layer control information is used for indicating the first-type control parameter of the second-type physical layer control channel. The first-type control parameter may specifically be parameter related to at least one of the sending or the receiving of the second-type physical layer control channel. The first-type control parameter includes at least one of the following parameters: a parameter for sending a second-type physical layer control channel; a reference pilot configuration parameter of a second-type physical layer control channel; or, a parameter for detecting a second-type physical layer control channel during reception of the second-type physical layer control channel. The value of each of the foregoing parameters may be a certain value or a range of values or a set of candidate values. If it is not a certain value, a receiving end needs to perform some blind detection to obtain an accurate control parameter.

In the present embodiment, the second-type physical layer control information includes M second-type physical layer control information blocks, M being a natural number greater than or equal to 1. The second-type physical layer control information is used for indicating a second-type control parameter of a data channel. The second-type control parameter may specifically be at least one of reference information of the sending of the data channel, reference information of the receiving of the data channel, or reference demodulation pilot configuration parameter information of the data channel.

In the present embodiment, as an implementation manner, the operation of sending the first-type physical layer control information includes: the first-type physical layer control information is sent through a first-type physical layer control channel; or, a preamble sequence is sent, so as to indicate the first-type physical layer control information through the preamble sequence; or, the first-type physical layer control information is notified through other physical layer control channels. Specifically, in the foregoing first sending mode, the first-type physical layer control information is sent by using the first-type physical layer control channel. In this sending mode, a special first physical layer control channel is provided before a second physical layer control channel, and the first physical layer control channel is dedicated to transmit the first-type physical layer control information. In the second sending mode, the first-type physical layer control information may be indicated by a preamble sequence in a basic time interval unit. That is, a preamble sequence is sent, and a parameter included in the first-type physical layer control information is indicated by using information in the preamble sequence. In the third sending mode, the first-type physical layer control information may be sent through other physical layer control channels than the first-type physical layer control channel.

By adopting the technical solution of the embodiment of the disclosure, the robustness of a control channel adopting MIMO transmission is guaranteed by adding control information (first-type physical layer control information), thereby solving the problem in the related art of severe degradation of system performance caused by overall link breaking once a beam cannot be aligned or blocked.

Second Embodiment

The embodiment of the disclosure also provides a method for sending control information. Based on the first embodiment, in the present embodiment, the first-type control parameter is used for indicating a parameter related to the sending of a second-type physical layer control channel. Specifically, the first-type control parameter includes at least one of the following parameters.

Figure 4:
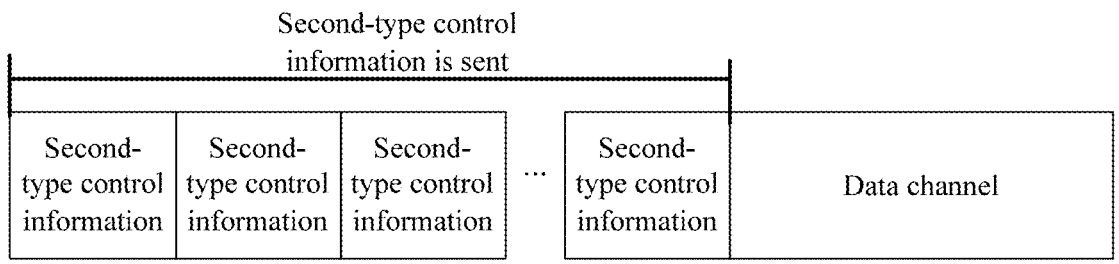

1. A parameter indicating a number of times of repeat sending the second-type physical layer control information: the number of times of repeat sending the second-type physical layer control information changes within a range less than or equal to Np times or equal to Np times; Np is a positive integer. The parameter indicating the number of times of repeat sending the second-type physical layer control information is used to indicate the number of times the second-type physical layer control information is sent repeatedly within a physical layer basic time interval (such as a subframe, differently named in different systems). As illustrated in FIG. 4, the number of transmissions may be a fixed value or an upper limit, such as sending for fixed Np times, or a value changed dynamically within a range of less than or equal to Np times.

Figure 5:
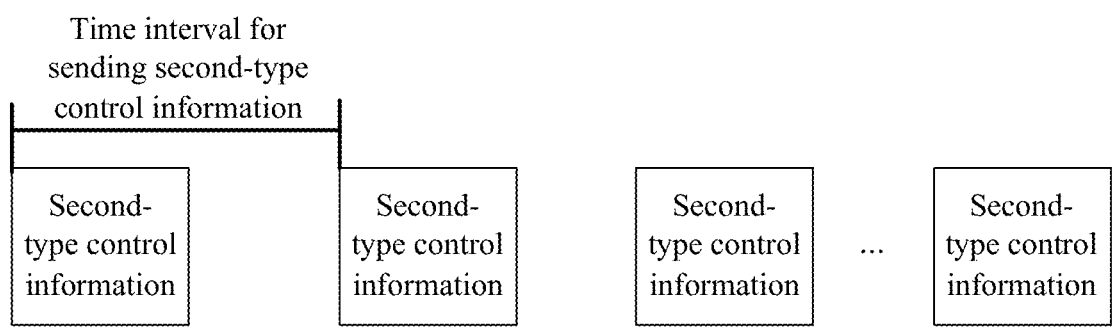

2. A time interval for sending the second-type physical layer control information: the time interval for sending second-type physical layer control information may be an interval in a physical layer basic time interval, specifically as illustrated in FIG. 5.

3. A parameter indicating a beam for sending the second-type physical layer control information: the parameter indicating the beam for sending the second-type physical layer control information may be represented by a sending beam number/ID, e.g., represented by a beam ID for sending each piece of second-type physical layer control information within a physical layer basic time interval or by a total number of sending beams, specifically as illustrated in Table 1.

TABLE 1

| First sending of control block 1 | Sending beam a |
|---|---|
| First sending of control block 1 | Sending beam b |
| ... | ... |
| First sending of control block 2 | Sending beam A |
| First sending of control block 2 | Sending beam B |

4. A parameter indicating a sector for sending the second-type physical layer control information: the parameter indicating the sector for sending the second-type physical layer control information may be represented by a sending sector number/ID, e.g., represented by a sector ID for sending each piece of second-type physical layer control information within a physical layer basic time interval or by a total number of sending sectors, specifically as illustrated in Table 2.

TABLE 2

| First sending of control block 1 | Sending sector a |
|---|---|
| Second sending of control block 1 | Sending sector b |
| ... | ... |
| First sending of control block 2 | Sending sector A |
| Second sending of control block 2 | Sending sector B |
| Second sending of control block 2 | Sending sector C |
| ... | |

5. A number of antennae for sending the second-type physical layer control information: the number of antennae for sending the second-type physical layer control information may be represented by a sending antenna number/ID, e.g., represented by an antenna ID for sending each piece of second-type physical layer control information within a physical layer basic time interval or by a total number of antennae, specifically as illustrated in Table 3.

TABLE 3

| First sending of control block 1 | Sending antenna a |
|---|---|
| First sending of control block 1 | Sending antenna b |
| ... | ... |
| First sending of control block 2 | Sending antenna A |
| First sending of control block 2 | Sending antenna B |

6. A number of the second-type physical layer control information blocks: the number of the second-type physical layer control information blocks changes within a range less than or equal to Nb or is equal to Nb, where Nb is a positive integer. The number of the second-type physical layer control information blocks may be represented by a maximum number of the second-type physical layer control information blocks of each piece of the second-type physical layer control information within a physical layer basic time interval, or a number of second-type physical layer control information blocks, actually sent, of each piece of second-type physical layer control information within a physical layer basic time interval. The number of information blocks actually sent may be obtained by the receiving end though detection.

Figure 6:
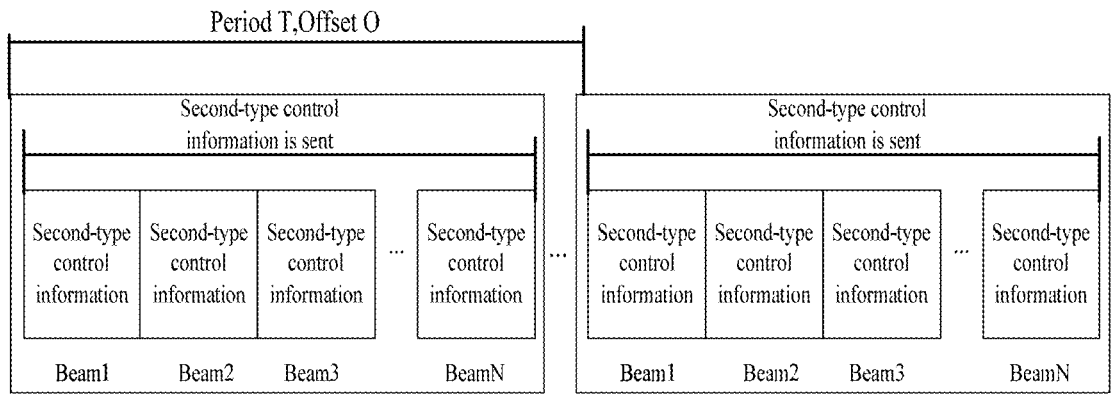

7. A sending period and a basic transmission time interval offset parameter of second-type physical layer control information: the basic transmission time interval is, e.g., a subframe. Specifically as illustrated in FIG. 6, a period T represents how many basic transmission time intervals (such as subframes) are spaced to send second-type physical layer control information once, and O represents offset information with respect to a basic transmission time interval 0 (such as subframe).

8. A transmission technology or mode for a control channel carrying second-type physical layer control information: the transmission technology or mode for the control channel is embodied as a relationship between a pilot signal and a control signal. For example, there are multiple functional relationships, F1 F2, . . . Fn between a data channel and a control channel. The relationship can be indicated by the first-type control information and which actually implies what transmission technology is used, such as diversity or beamforming.

Figure 7:
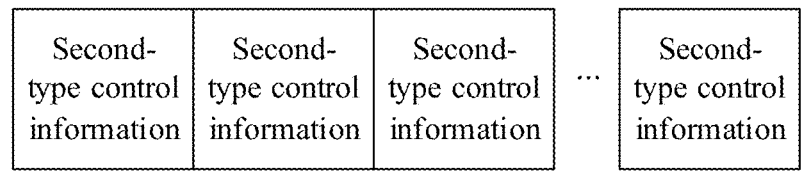
Figure 7:
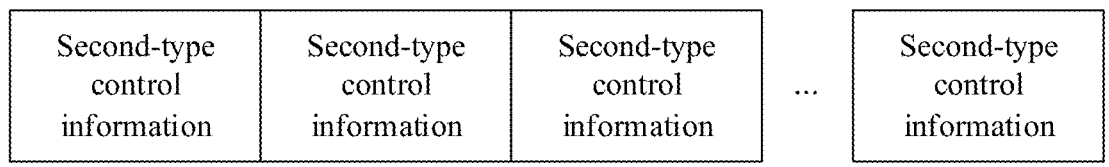

9. A length of a time domain symbol carrying the second-type physical layer control information: for example, a length of accumulated time domain symbols, which needs to be indicated by the first-type physical layer control information, as illustrated in view a and view b in FIG. 7.

Figure 8:
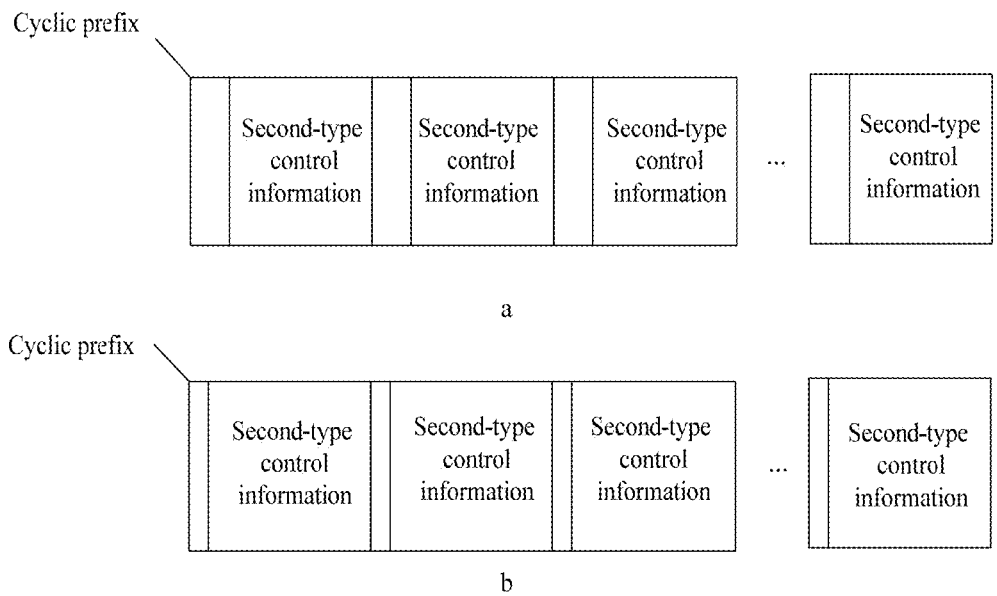

10. A cyclic prefix of time domain symbol carrying the second-type physical layer control information: for example, multiple types of cyclic prefixes for time domain symbols are existed and which need to be indicated by the first-type physical layer control information, as illustrated in view a and view b in FIG. 8.

Figure 9:
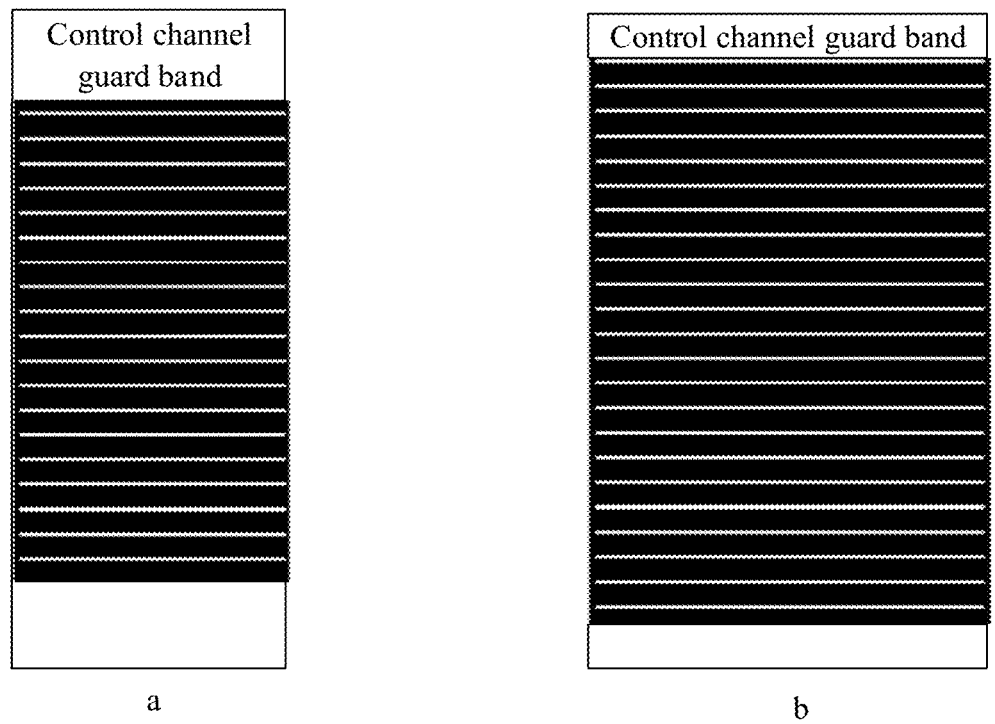
Figure 10:
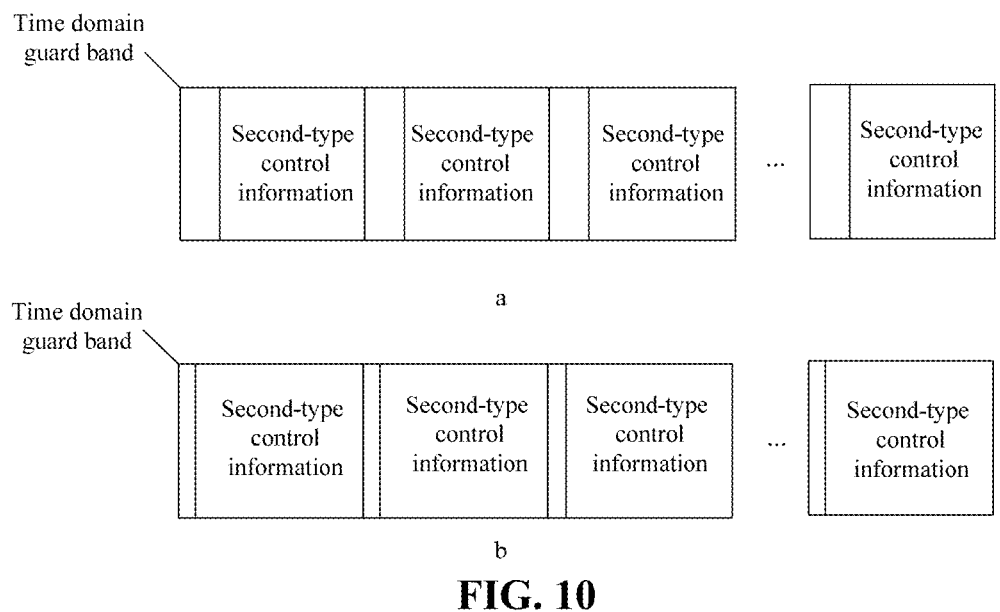

11. A frequency domain or time domain guard band for the control channel carrying the second-type physical layer control information: for example, there are multiple frequency domain guard band parameters as illustrated in view a and view b in FIG. 9, which need to be indicated by the first-type control information. For another example, there are multiple time domain guard band parameters as illustrated in view a and view b in FIG. 10, which need to be indicated by the first-type physical layer control information.

12. A frequency domain subcarrier spacing or density of the control channel carrying the second-type physical layer control information: the frequency domain resource for control channel transmission has different numbers of subcarriers, subcarrier spacing and density parameters, which need to be indicated by the first-type physical layer information.

13. A sending power of the second-type physical layer control information: the sending power includes a relative demodulation pilot power, or a sending power relative to the first-type physical layer control information, and a candidate value of the sending power may be 0 dB, −3 dB, 3 dB, 6 dB, 9 dB or the like. 14. A number of transmission layers for the control channel carrying second-type physical layer control information: the number of transmission layers changes within a range less than or equal to r or equal to r, where r is a positive integer. As an implementation manner, the number of transmission layers may be specified as r, or the number of transmission layers is less than or equal to r, which can be selected by the sending end flexibly, and r may take any value such as 1 and 2.

Third Embodiment

The embodiment of the disclosure also provides a method for sending control information. Based on the first embodiment, in the present embodiment, the first-type control parameter is used for indicating a reference pilot configuration parameter of a second-type physical layer control channel. Specifically, the first-type control parameter includes at least one of the following parameters:

a number of ports for a pilot, such as port 1 or port 2;

a multiplex mode for a pilot, such as pilots on different ports are multiplexed according to code division multiplexing (CDM) 2, pilots on different ports are multiplexed according to CDM 4, pilot signal and control signal are multiplexed according to frequency division multiplexing, pilot signal and control signal are multiplexed according to time division multiplexing or the like;

a time or frequency density of a pilot, for example, the frequency domain density is 1, ½, ¼, etc., and the time domain density mainly refers to the number of pilot resource symbols per unit time;

a length of time domain symbol for a pilot, the length of time domain symbol for the pilot and the length of time domain symbol for control signal may be the same or different;

a cyclic prefix for sending a pilot, the cyclic prefix for sending the pilot and the cyclic prefix of time domain symbol for control signal may be the same or different;

a time domain or frequency domain guard band for a pilot, the time or frequency domain guard band for the pilot and the time or frequency domain guard band for the control signal may be the same or different;

a position at which a pilot is sent, such as a resource pattern for sending the pilot, and a time-frequency resource position at which the pilot is sent;

a sending power of a pilot, such as a level of the sending power of the pilot, and a relationship between powers of pilots at different positions;

a type of a pilot, such as precoding pilots, non-precoding pilots, wide beam pilots, narrow beam pilots, periodic pilots, non-periodic pilots, and the like;

a subcarrier spacing or density for sending a pilot.

Fourth Embodiment

The embodiment of the disclosure also provides a method for sending control information. Based on the first embodiment, in the present embodiment, the first-type control parameter is used for indicating parameter related to the receiving of a second-type physical layer control channel. Specifically, the first-type control parameter includes at least one of the following parameters:

a parameter for indicating a receiving antenna port, such as port 1 or port 2;

a parameter for indicating a receiving/detecting sector range (a parameter for indicating a sector range to be detected during reception of the second-type physical layer control channel); for example, which beam ranges, beam ID sets and direction sets need to be detected, and for another example, which sending sector/receiving sector sets need to be detected;

a parameter indicating a number of times of receiving/ detecting, such as a maximum number of times of attempt to be detected;

a parameter indicating a receiving mode, such as omnidirectional receiving or directional receiving, for example, which antenna or sector is used for receiving, the type of receiving mode of attempts is determined;

a parameter indicating a receiving beam range;

a parameter indicating a receiving/detecting position, such as the positions of time-frequency resources for detection to be performed for receiving the second-type physical layer control channel;

a parameter indicating a basic detection unit of receiving/ detecting, which may be represented by a size or division manner of Control Channel Element (CCE) For example, whether a basic detection unit is a first-type detection unit (smaller granularity) or a second-type detection unit (larger granularity) may be indicated;

a resource aggregation granularity of receiving/detecting, the resource aggregation granularity is, for example, an aggregation level/aggregation level set; for example, a time domain symbol is used as minimum granularity for detection, or two time domain symbols are used as minimum granularity for detection.

Fifth Embodiment

Figure 11A:
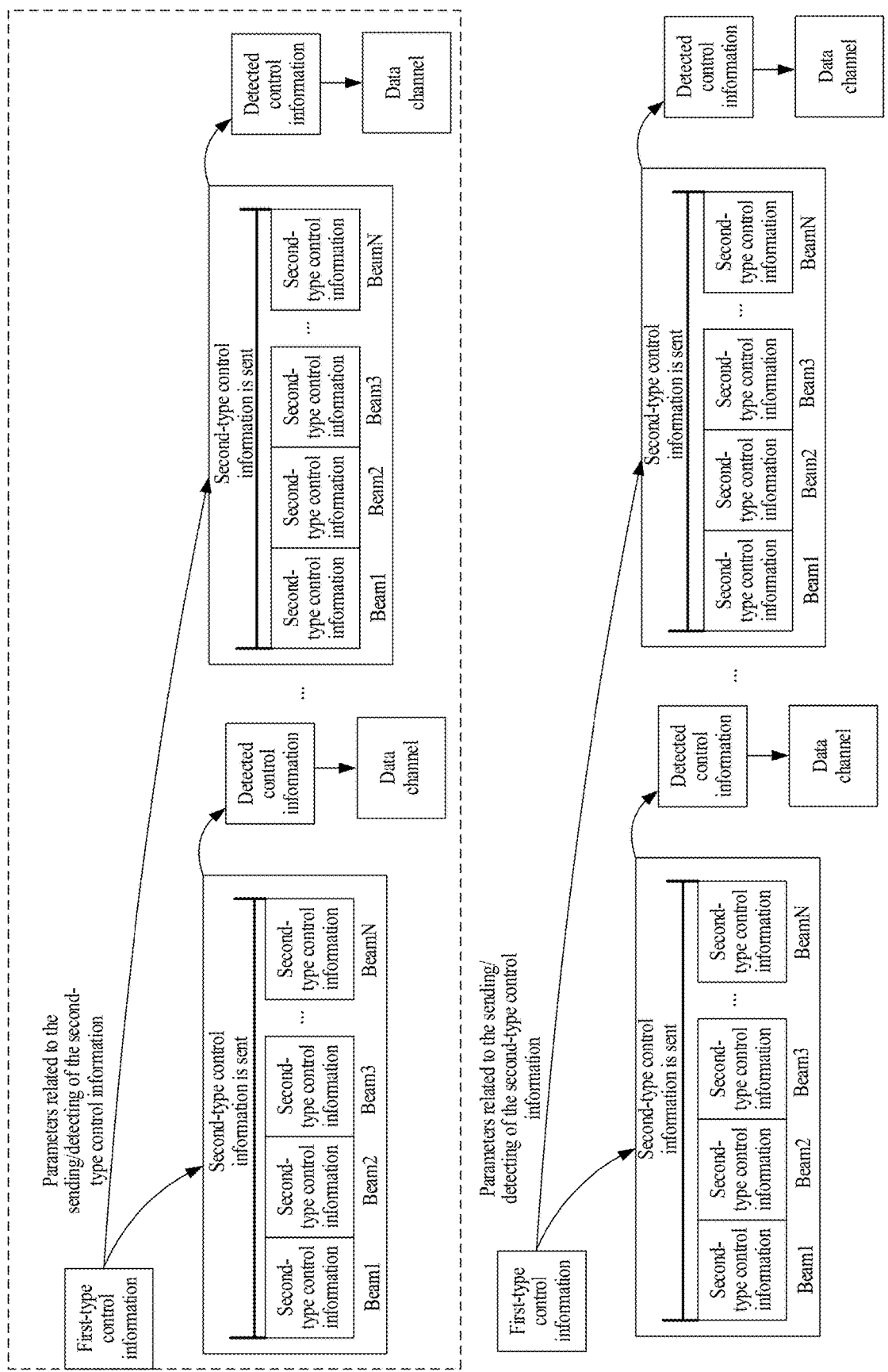
Figure 11B:
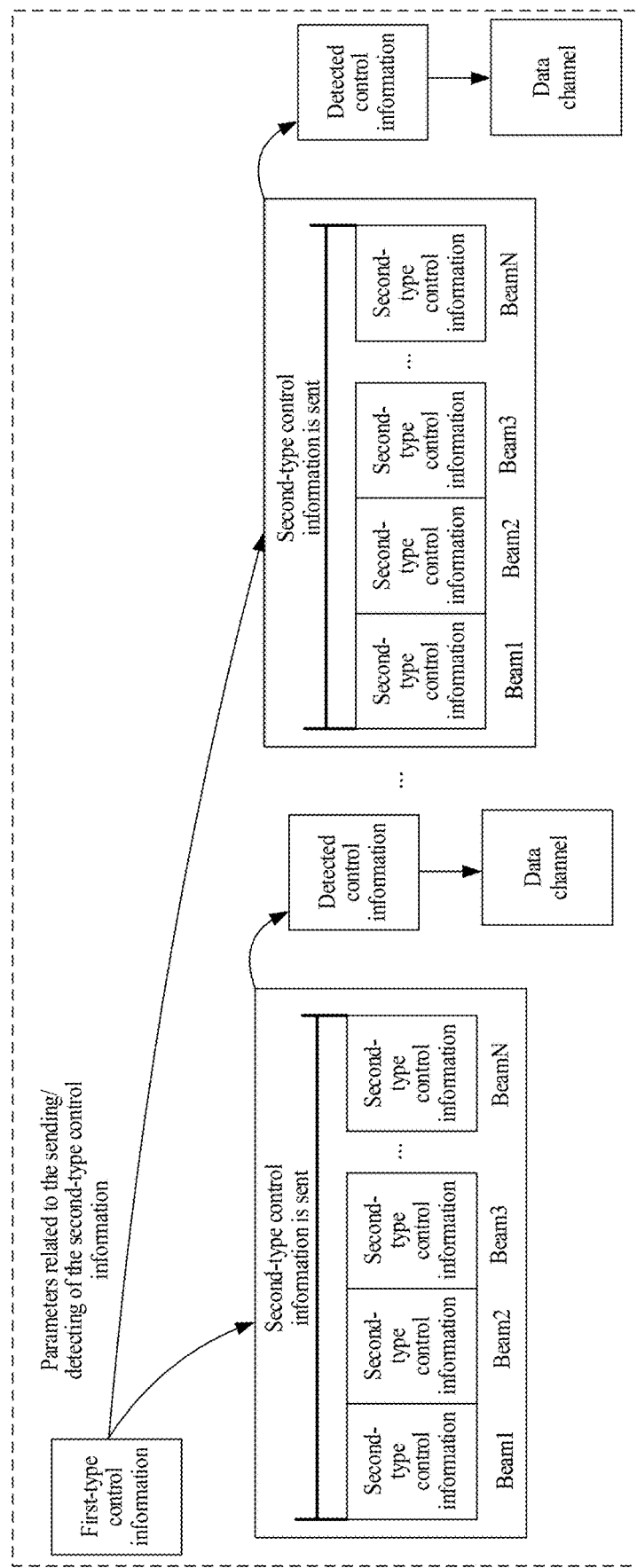

The embodiment of the disclosure also provides a method for sending control information. Based on the first embodiment, in the present embodiment, a sending period of the first-type physical layer control information is N times of a sending period of the second-type physical layer control information, N being a natural number, as illustrated in FIG. 11a and FIG. 11b. FIG. 11b is a schematic diagram of a sending period in FIG. 11a. The first-type control information in the figure represents the first-type physical layer control information, and the second-type control information in the figure represents the second-type physical layer control information.

Sixth Embodiment

The embodiment of the disclosure also provides a method for sending control information. Based on the first embodiment, in the present embodiment, a frequency band in which the first-type physical layer control information is sent is lower than a frequency band in which the second-type physical layer control information is sent. It may be understood as that the first-type physical layer control information is sent at a low frequency band, and the second-type physical layer control information is sent at a high frequency band. As an implementation, the sending frequency band of the first-type physical layer control information is less than 6 GHZ, and the sending frequency band of the second-type physical layer control information is more than 6 GHZ.

Seventh Embodiment

The embodiment of the disclosure also provides a method for sending control information. Based on the first embodiment, in the present embodiment, the first-type physical layer control information is sent in a more robust sending manner with respect to the second-type physical layer control information. As the first implementation, the first-type physical layer control information is sent by using X1 beams or sectors or antennas or time domain symbols, and the second-type physical layer control information is sent on no more than X2 beams or sectors or antennae or time domain symbols, X1 and X2 being positive integers, and X1 being greater than or equal to X2.

Eighth Embodiment

Figure 12:
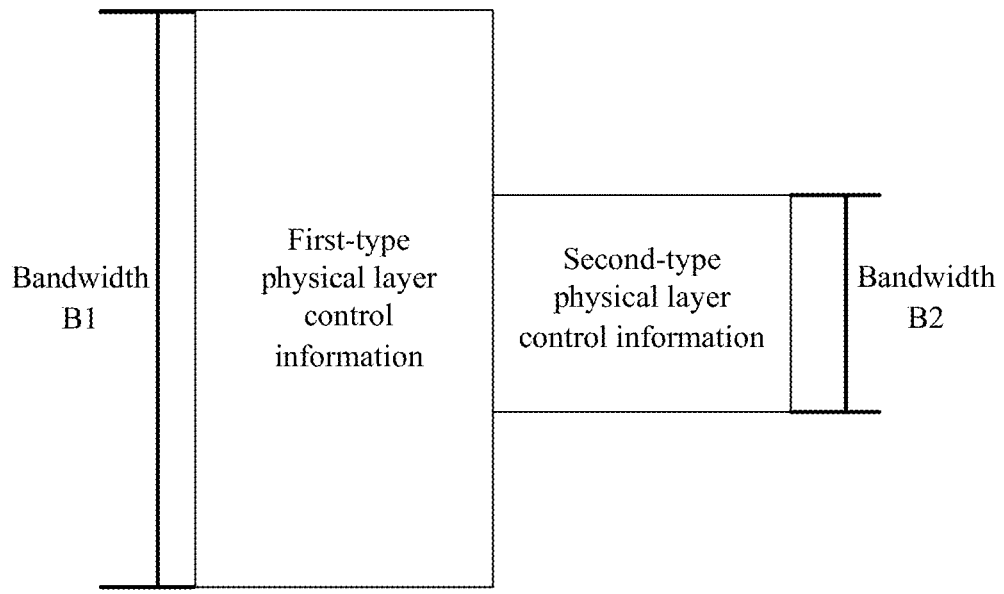

The embodiment of the disclosure also provides a method for sending control information. Based on the first embodiment, in the present embodiment, the first-type physical layer control information is sent in a more robust sending manner with respect to the second-type physical layer control information. As another implementation, the first-type physical layer control channel uses a bandwidth B1 for transmission, and the second-type physical layer control channel uses a bandwidth B2 for transmission, B1 and B2 being positive integers, and B1 being greater than or equal to B2, as illustrated in FIG. 12.

Ninth Embodiment

Figure 13:
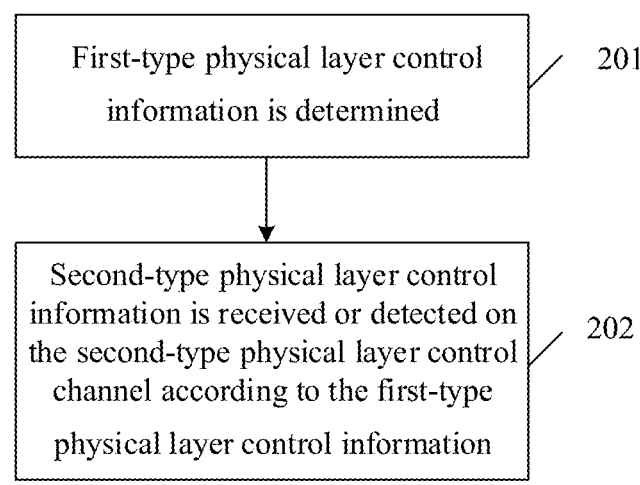
FIG. 13 is a first schematic flowchart of a method for detecting control information according to an embodiment of the disclosure.

The embodiment of the disclosure also provides a method for detecting control information. FIG. 13 is a first schematic flowchart of a method for detecting control information according to an embodiment of the disclosure. As illustrated in FIG. 13, the control information detecting method includes the operations as follows.

At operation 201, first-type physical layer control information is determined, the first-type physical layer control information being indicative of a first-type control parameter of a second-type physical layer control channel.

At operation 202, second-type physical layer control information is received or detected on the second-type physical layer control channel according to the first-type physical layer control information.

The control information detecting method in the present embodiment is applied to a receiving end, and the receiving end may be specifically a terminal.

In the present embodiment, the operation of determining first-type physical layer control information includes: the first-type physical layer control information is determined by receiving the first-type physical layer control information; or, first-type physical layer control information is determined by detecting a preamble sequence indication; or, first-type physical layer control information is determined by performing a blind detection within a parameter range of a first-type physical layer control information, the parameter range of the first-type physical layer control information is agreed by the receiving end with a sending end; or, the first-type physical layer control information is determined by receiving information of other physical layer control channels. Specifically, the foregoing first determining mode is based on an application scenario in which the sending end sends first-type physical layer control information by using a first-type physical layer control channel, and based on this, the receiving end receives and determines the first-type physical layer control information through the first-type physical layer control channel. In the foregoing second determining mode, the sending end indicates first-type physical layer control information by sending a preamble sequence, and the receiving end detects the preamble sequence, and determines the first-type physical layer control information according to information in the preamble sequence. In the foregoing third determining mode, the sending end and the receiving end agree with each other in advance about a first-type physical layer control information parameter to determine the first-type physical layer control information. The foregoing fourth determining mode is based on an application scenario in which the sending end sends first-type physical layer control information by using other physical layer control channels.

In the present embodiment, the first-type physical layer control information is used for indicating a first-type control parameter of a second-type physical layer control channel. The first-type control parameter may specifically be parameter related to the sending and/or receiving of a second-type physical layer control channel. The first-type control parameter includes at least one of the following parameters: a sending parameter of a second-type physical layer control channel; a reference pilot configuration parameter of a second-type physical layer control channel; or, a receiving/detecting parameter of a second-type physical layer control channel. The value of each of the foregoing parameters may be a certain value or a range of values or a set of candidate values. If it is not a certain value, a receiving end needs to perform some blind detection to obtain an accurate control parameter.

By adopting the technical solution of the embodiment of the disclosure, the robustness of a control channel adopting MIMO transmission is guaranteed by adding control information (first-type physical layer control information), thereby solving the problem in the related art of severe degradation of system performance caused by overall link breaking once a beam cannot be aligned or blocked.

Tenth Embodiment

The embodiment of the disclosure also provides a method for detecting control information. Based on the ninth embodiment, in the present embodiment, as an implementation, the second-type physical layer control information includes at least one second-type physical layer control information block.

The first-type control parameter includes at least one of the following parameters: a parameter indicating a number of times of repeat sending second-type physical layer control information; a time interval for sending second-type physical layer control information; a parameter indicating a beam for sending of second-type physical layer control information; a parameter indicating a sector for sending second-type physical layer control information; a number of antennae for sending the second-type physical layer control information; a number of the second-type physical layer control information blocks; a sending period and a basic transmission time interval offset parameter of second-type physical layer control information; a transmission technology or mode for a control channel carrying second-type physical layer control information; a time domain symbol length parameter carrying second-type physical layer control information; a cyclic prefix of time domain symbol carrying second-type physical layer control information; a frequency domain/time domain guard band for a control channel carrying second-type physical layer control information; a frequency domain subcarrier spacing or density of a control channel carrying second-type physical layer control information; a sending power of second-type physical layer control information; or, a number of transmission layers for a control channel carrying second-type physical layer control information.

As another implementation manner, the first-type control parameter includes at least one of the following parameters: a number of ports for a pilot; a multiplex mode for a pilot; a time or frequency density of a pilot; a length of a time domain symbol for a pilot; a cyclic prefix for sending a pilot; a time or frequency domain guard band for a pilot; a position at which a pilot is sent; a sending power of a pilot; a type of a pilot; or, a subcarrier spacing or density for sending a pilot.

As yet another implementation, the first-type control parameter includes at least one of the following parameters: a parameter for indicating a receiving antenna port; a parameter for indicating a receiving/detecting sector range; a parameter indicating a number of times of receiving/detecting; a parameter indicating a receiving mode; a parameter indicating a receiving beam range; a parameter indicating a receiving/detecting position; a parameter indicating a basic detection unit of receiving/detecting; a resource aggregation granularity of receiving/detecting.

The specific description of the parameters included in the foregoing first-type control parameter may be referred to the second embodiment to the fourth embodiment, and will not be described in detail herein.

Eleventh Embodiment

The embodiment of the disclosure also provides a method for detecting control information. Based on the ninth embodiment, in the present embodiment, a receiving period of the first-type physical layer control information is N times of a receiving period of the second-type physical layer control information, a detecting period of the first-type physical layer control information is N times of a detecting period of the second-type physical layer control information, N being a natural number.

Twelfth Embodiment

The embodiment of the disclosure also provides a method for detecting control information. Based on the ninth embodiment, in the present embodiment, a receiving/detecting frequency band of the first-type physical layer control information is lower than a receiving/detecting frequency band of the second-type physical layer control information. It may be understood as that the first-type physical layer control information is received/detected at a low frequency band, and the second-type physical layer control information is received/detected at a high frequency band. As an implementation manner, the receiving/detecting frequency band of the first-type physical layer control information is less than 6 GHZ, and the receiving/detecting frequency band of the second-type physical layer control information is more than 6 GHZ.

Thirteenth Embodiment

The embodiment of the disclosure also provides a method for detecting control information. Based on the ninth embodiment, in the present embodiment, the first-type physical layer control information is received/detected in a more robust manner with respect to the second-type physical layer control information. As the first implementation, the first-type physical layer control information is received by using X1 beams or sectors or antennas or time domain symbols, and the second-type physical layer control information is received by using no more than X2 beams or sectors or antennas or time domain symbols, X1 and X2 being positive integers, and X1 being greater than or equal to X2.

Fourteenth Embodiment

The embodiment of the disclosure also provides a method for detecting control information. Based on the ninth embodiment, in the present embodiment, the first-type physical layer control information is received/detected in a more robust manner with respect to the second-type physical layer control information. As the first implementation, the first-type physical layer control channel uses a bandwidth B1 for receiving/detecting, and the second-type physical layer control channel uses a bandwidth B2 for receiving/detecting, B1 and B2 being positive integers, and B1 being greater than or equal to B2.

Fifteenth Embodiment

Figure 14:
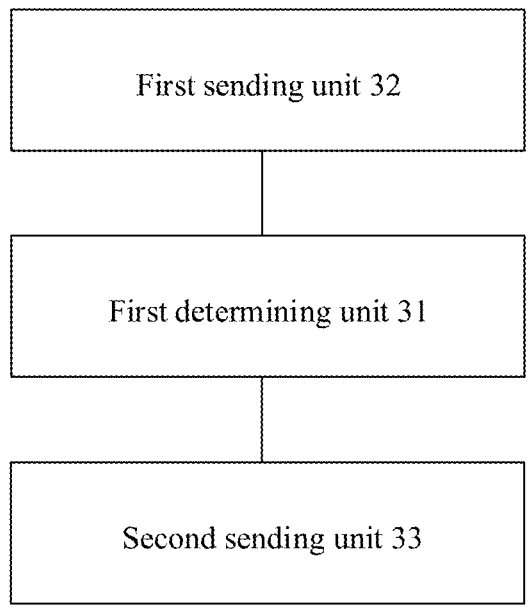
FIG. 14 is a first structure diagram of a base station according to an embodiment of the disclosure.

The embodiment of the disclosure also provides a base station. FIG. 14 is a structure diagram of a base station according to an embodiment of the disclosure. As illustrated in FIG. 14, the base station includes: a first determining unit 31, a first sending unit 32 and a second sending unit 33.

The first determining unit 31 is configured to determine first-type physical layer control information, the first-type physical layer control information being used to indicate a first-type control parameter of a second-type physical layer control channel, and further configured to determine second-type physical layer control information, the second-type physical layer control information being used to indicate a second-type control parameter of a data channel.

The first sending unit 32 is configured to send the first-type physical layer control information determined by the first determining unit 31.

The second sending unit 33 is configured to send the second-type physical layer control information determined by the first determining unit 31 on the second-type physical layer control channel.

In the present embodiment, the first-type physical layer control information is used for indicating the first-type control parameter of the second-type physical layer control channel. The first-type control parameter may specifically be parameter related to at least one of the sending or the receiving of the second-type physical layer control channel. The first-type control parameter includes at least one of the following parameters: a parameter for sending a second-type physical layer control channel; a reference pilot configuration parameter of a second-type physical layer control channel; or, a parameter for detecting a second-type physical layer control channel during reception of the second-type physical layer control channel. The value of each of the foregoing parameters may be a certain value or a range of values or a set of candidate values. If it is not a certain value, a receiving end needs to perform some blind detection to obtain an accurate control parameter.

In the present embodiment, the second-type physical layer control information includes M second-type physical layer control information blocks, M being a natural number more than or equal to 1. The second-type physical layer control information is used to indicate a second-type control parameter of a data channel, and the second-type control parameter may specifically be at least one of reference information of the sending of the data channel, reference information of the receiving of the data channel, or reference demodulation pilot configuration parameter information of the data channel.

In the present embodiment, the first sending unit 32 is configured to: send the first-type physical layer control information through a first-type physical layer control channel; or, send a preamble sequence, so as to indicate the first-type physical layer control information through the preamble sequence; or, notify the first-type physical layer control information through other physical layer control channels. Specifically, in the foregoing first sending mode, the first-type physical layer control information is sent by using the first-type physical layer control channel, where a special first physical layer control channel is provided in front of a second physical layer control channel, and the first physical layer control channel is dedicated to transmit the first-type physical layer control information. In the second sending mode, the first-type physical layer control information may be indicated by a preamble sequence in a basic time interval unit. That is, by sending a preamble sequence, a parameter included in the first-type physical layer control information is indicated by using information in the preamble sequence. In the third sending mode, the first-type physical layer control information may be sent through other physical layer control channels than the first-type physical layer control channel.

Based on the second embodiment to the eighth embodiment, in the present embodiment, the second-type physical layer control information includes at least one second-type physical layer control information block. As an implementation manner, the first-type control parameter includes at least one of the following parameters:

a parameter indicating a number of times of repeat sending the second-type physical layer control information; a time interval for sending the second-type physical layer control information; a parameter indicating a beam for sending the second-type physical layer control information; a parameter indicating a sector for sending the second-type physical layer control information; a number of antennae for sending the second-type physical layer control information; a sending number of the second-type physical layer control information blocks; a sending period and a basic transmission time interval offset parameter of the second-type physical layer control information; a transmission technology or mode for a control channel carrying the second-type physical layer control information; a length of a time domain symbol carrying the second-type physical layer control information; a cyclic prefix of the time domain symbol carrying the second-type physical layer control information; a frequency or time domain guard band for the control channel carrying the second-type physical layer control information; a frequency domain subcarrier spacing or density of the control channel carrying the second-type physical layer control information; a sending power of the second-type physical layer control information; or, a number of transmission layers for the control channel carrying the second-type physical layer control information.

As another implementation manner, the first-type control parameter includes at least one of the following parameters: a number of ports for a pilot; a multiplex mode for a pilot; a time or frequency density of a pilot; a length of a time domain symbol for a pilot; a cyclic prefix for sending a pilot; a time or frequency domain guard band for a pilot; a position at which a pilot is sent; a sending power of a pilot; a type of a pilot; or, a subcarrier spacing or density for sending a pilot.

As yet another implementation manner, the first-type control parameter includes at least one of the following parameters: a parameter for indicating a receiving antenna port; a parameter for indicating a receiving/detecting sector range; a parameter indicating a number of times of receiving/detecting; a parameter indicating a receiving mode; a parameter indicating a receiving beam range; a parameter indicating a receiving/detecting position; a parameter indicating a basic detection unit of receiving/detecting; a resource aggregation granularity of receiving/detecting.

As an implementation manner, a sending period of the first-type physical layer control information is N times of a sending period of the second-type physical layer control information, N being a natural number.

As an implementation manner, a frequency band for sending the first-type physical layer control information is lower than a frequency band for sending the second-type physical layer control information. As one of the implementation manners, the sending frequency band of the first-type physical layer control information is less than 6 GHZ, and the sending frequency band of the second-type physical layer control information is more than 6 GHZ.

As an implementation manner, in the present embodiment, the first-type control parameter is sent in a more robust sending manner with respect to the second-type physical layer control information. The first-type physical layer control information is sent by using X1 beams or sectors or antennas or time domain symbols, and the second-type physical layer control information is sent by using at most X2 beams or sectors or antennas or time domain symbols, X1 and X2 being positive integers, and X1 being greater than or equal to X2.

As an implementation manner, in the present embodiment, the first-type control parameter is sent in a more robust sending manner with respect to the second-type physical layer control information. The first-type physical layer control channel uses a bandwidth B1 for transmission, and the second-type physical layer control channel uses a bandwidth B2 for transmission, B1 and B2 being positive integers, and B1 being greater than or equal to B2.

In the embodiment of the disclosure, the first determining unit 31 in the base station may be implemented by a processor in the base station, such as a Central Processing Unit (CPU), a Digital Signal Processor (DSP), a Microcontroller Unit (MCU) or a Field-Programmable Gate Array (FPGA) in practical applications; the first sending unit 32 and the second sending unit 33 in the base station may be implemented through a communication module (including: a basic communication kit, an operating system, a communication module, a standardized interface, a protocol, etc.) and a transceiver antenna in practical applications.

Sixteenth Embodiment

Figure 15:
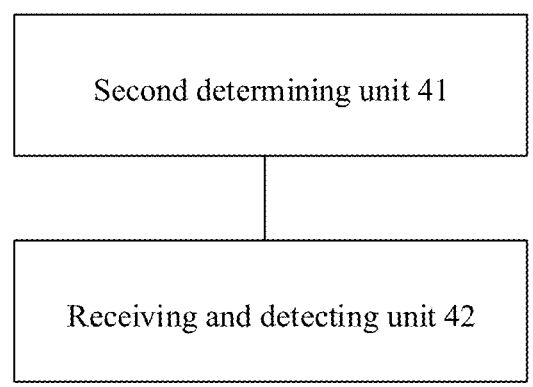
FIG. 15 is a first structure diagram of a terminal according to an embodiment of the disclosure.

The embodiment of the disclosure also provides a terminal. FIG. 15 is a structure diagram of a terminal according to an embodiment of the disclosure. As illustrated in FIG. 15, the terminal includes: a second determining unit 41 and a receiving and detecting unit 42.

The second determining unit 41 is configured to determine first-type physical layer control information, the first-type physical layer control information being indicative a first-type control parameter of a second-type physical layer control channel.

The receiving and detecting unit 42 is configured to receive or detect second-type physical layer control information on the second-type physical layer control channel according to the first-type physical layer control information determined by the second determining unit 41.

In the present embodiment, the second determining unit 41 is configured to: receive first-type physical layer control information to determine the first-type physical layer control information; or, determine first-type physical layer control information by detecting a preamble sequence indication; or, determine first-type physical layer control information by agreeing with a sending end about a parameter range of a first-type physical layer control information and performing blind detection within the parameter range; or, determine first-type physical layer control information by receiving information of other physical layer control channels. Specifically, the foregoing first determining mode is based on an application scenario in which the sending end sends first-type physical layer control information by using a first-type physical layer control channel, and based on this, the receiving end receives and determines the first-type physical layer control information through the first-type physical layer control channel. In the foregoing second determining mode, the sending end indicates first-type physical layer control information by sending a preamble sequence, and the receiving end detects the preamble sequence, and determines the first-type physical layer control information through information in the preamble sequence. In the foregoing third determining mode, the sending end and the receiving end agree with each other in advance about a first-type physical layer control information parameter to determine the first-type physical layer control information. The foregoing fourth determining mode is based on an application scenario in which the sending end sends first-type physical layer control information by using other physical layer control channels.

In the present embodiment, the first-type physical layer control information is used for indicating the first-type control parameter of the second-type physical layer control channel. The first-type control parameter may specifically be parameter related to at least one of the sending or the receiving of the second-type physical layer control channel. The first-type control parameter includes at least one of the following parameters: a parameter for sending a second-type physical layer control channel; a reference pilot configuration parameter of a second-type physical layer control channel; or, a parameter for detecting a second-type physical layer control channel during reception of the second-type physical layer control channel. The value of each of the foregoing parameters may be a certain value or a range of values or a set of candidate values. If it is not a certain value, a receiving end needs to perform some blind detection to obtain an accurate control parameter.

Based on the tenth embodiment to the fourteenth embodiment, in the present embodiment, the second-type physical layer control information includes at least one second-type physical layer control information block. As an implementation manner, the first-type control parameter includes at least one of the following parameters:

a parameter indicating a number of times of repeat sending the second-type physical layer control information; a time interval for sending the second-type physical layer control information; a parameter indicating a beam for sending the second-type physical layer control information; a parameter indicating a sector for sending the second-type physical layer control information; a number of antennae for sending the second-type physical layer control information; a sending number of the second-type physical layer control information blocks; a sending period and a basic transmission time interval offset parameter of the second-type physical layer control information; a transmission technology or mode for a control channel carrying the second-type physical layer control information; a length of a time domain symbol carrying the second-type physical layer control information; a cyclic prefix of the time domain symbol carrying the second-type physical layer control information; a frequency or time domain guard band for the control channel carrying the second-type physical layer control information; a frequency domain subcarrier spacing or density of the control channel carrying the second-type physical layer control information; a sending power of the second-type physical layer control information; or, a number of transmission layers for the control channel carrying the second-type physical layer control information.

As another implementation manner, the first-type control parameter includes at least one of the following parameters: a number of ports for a pilot; a multiplex mode for a pilot; a time or frequency density of a pilot; a length of a time domain symbol for a pilot; a cyclic prefix for sending a pilot; a time or frequency domain guard band for a pilot; a position at which a pilot is sent; a sending power of a pilot; a type of a pilot; or, a subcarrier spacing or density for sending a pilot.

As yet another implementation manner, the first-type control parameter includes at least one of the following parameters: a parameter for indicating a receiving antenna port; a parameter for indicating a receiving/detecting sector range; a parameter indicating a number of times of receiving/detecting; a parameter indicating a receiving mode; a parameter indicating a receiving beam range; a parameter indicating a receiving/detecting position; a parameter indicating a basic detection unit of receiving/detecting; a resource aggregation granularity of receiving/detecting.

A receiving period of the first-type physical layer control information is N times of a receiving period of the second-type physical layer control information, a detecting period of the first-type physical layer control information is N times of a detecting period of the second-type physical layer control information, N being a natural number.

A frequency band for receiving the first-type physical layer control information is lower than a frequency band for receiving the second-type physical layer control information. A frequency band for detecting the first-type physical layer control information is lower than a frequency band for detecting the second-type physical layer control information.

The first-type physical layer control information is received by using X1 beams or sectors or antennas or time domain symbols, and the second-type physical layer control information is received by using at most X2 beams or sectors or antennas or time domain symbols, X1 and X2 being positive integers, and X1 being greater than or equal to X2.

The first-type physical layer control channel uses a bandwidth B1 for receiving/detecting, and the second-type physical layer control channel uses a bandwidth B2 for receiving/detecting, B1 and B2 being positive integers, and B1 being greater than or equal to B2.

In the embodiment of the disclosure, the second determining unit 41 in the terminal may be implemented by a processor in the terminal, such as a CPU, a DSP, an MCU or an FPGA in practical applications; the receiving/detecting unit 42 in the terminal may be implemented through a communication module (including: a basic communication kit, an operating system, a communication module, a standardized interface, a protocol, etc.) and a transceiver antenna in practical applications.

Seventeenth Embodiment

Figure 16:
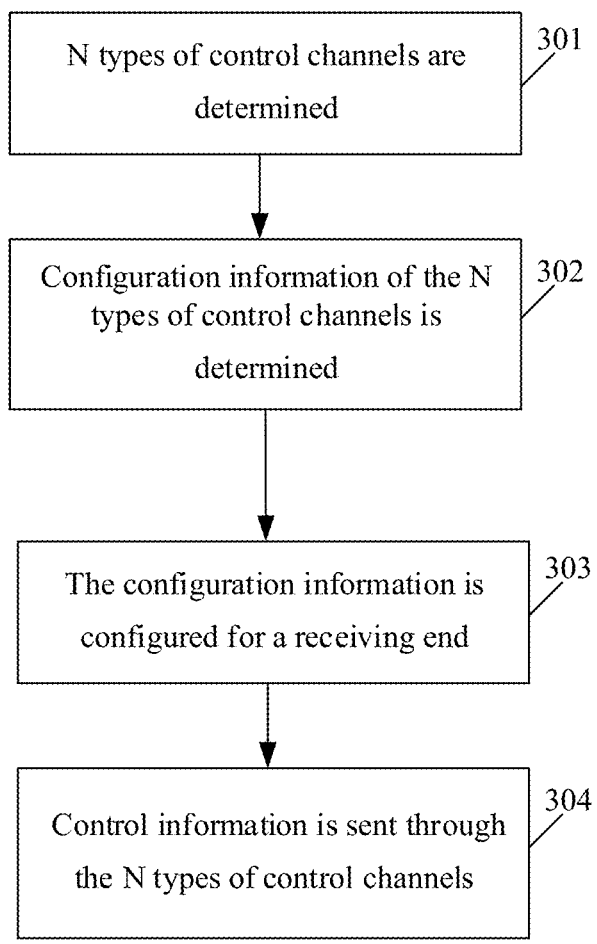
FIG. 16 is a second schematic flowchart of a method for sending control information according to an embodiment of the disclosure.

The embodiment of the disclosure also provides a method for sending control information. FIG. 16 is a second schematic flowchart of a control information sending method according to an embodiment of the disclosure. As illustrated in FIG. 16, the control information sending method includes the operations as follows.

At operation 301, N types of control channels are determined, where N is an integer greater than or equal to 1.

At operation 302, configuration information of the N types of control channels is determined.

At operation 303, the configuration information is configured for a receiving end.

At operation 304, control information is sent through the N types of control channels.

Figure 17:
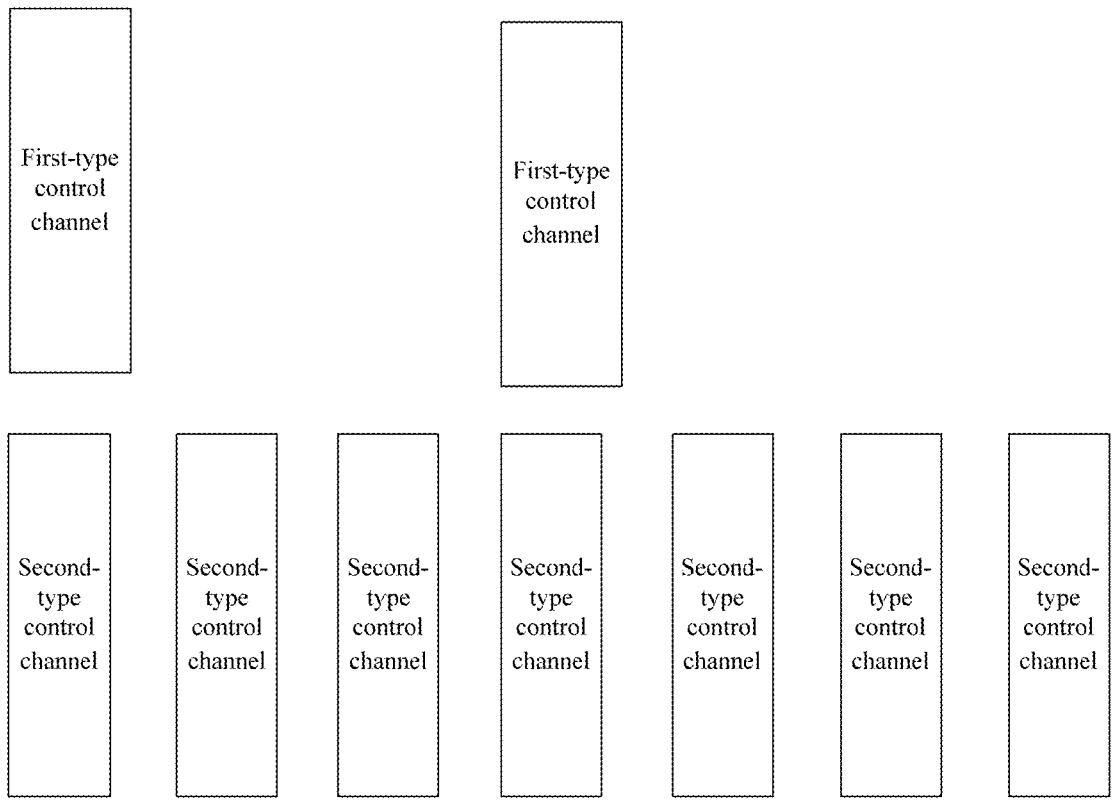
FIG. 17 is a schematic diagram of N types of control channels according to an embodiment of the disclosure.

In the control information sending method of the present embodiment, a sending end configures N types of control channels, where N is greater than or equal to 1. As an implementation, N is equal to 2 or 3. As illustrated in FIG. 17, each type of control channel can be used for sending configuration information related to a data channel, the transmission of the first-type control channel is more robust, and the transmission efficiency of the second-type control channel is higher, so as to guarantee the robustness of a control channel using MIMO transmission, especially in a situation where MIMO uses radio frequency precoding and baseband precoding to perform beamforming.

In the present embodiment, the sending end determines configuration information of N types of control channels. The configuration information includes at least one of the following parameters: parameters for sending the N types of control channels; demodulation pilot parameters of the N types of control channels; or, parameters of detections to be performed for the N types of control channels during reception of the N types of control channels. The value of each of the foregoing parameters may be a certain value or a range of values or a set of candidate values. If it is not a certain value, a receiving end needs to perform some blind detection to obtain an accurate control parameter.

In the present embodiment, the operation of configuring the configuration information for a receiving end includes: the receiving end is notified of the configuration information through signaling transmitted on a same carrier as that for data transmission; or, the receiving end is notified of the configuration information through signaling on a carrier different from that for data transmission; or, a preamble sequence is sent to the receiving end, and the configuration information is configured for the receiving end through the preamble sequence. Here, configuration parameters of N types of control channels need to be configured, and the sending end sends control information through the N types of control channels.

According to the technical solution of the present embodiment, configuration information of N types of control channels is configured to make the transmission of one or more types of control channels more robust, and the transmission efficiency of other types of control channels is higher, thereby guaranteeing the robustness of a control channel adopting MIMO transmission, thereby solving the problem in the related art of severe degradation of system performance caused by overall link breaking once a beam cannot be aligned or blocked.

Eighteenth Embodiment

The embodiment of the disclosure also provides a method for sending control information. Based on the seventeenth embodiment, in the present embodiment, when N is more than or equal to 2, a sending period allocated for a first-type control channel is M times of a sending period allocated for a second-type control channel, M being a positive integer.

Specifically, in the present embodiment, there are at least a first-type control channel and a second-type control channel; the transmission of the first-type control channel is more robust, and the transmission efficiency of the second-type control channel is higher; and based on the design principle, an available sending resource period allocated for the first-type control channel is M times of an available sending resource period allocated for the second-type control channel.

Nineteenth Embodiment

The embodiment of the disclosure also provides a method for sending control information. Based on the seventeenth embodiment, in the present embodiment, if N is more than or equal to 2, a sending frequency band allocated for a first-type control channel is smaller than a sending frequency band allocated for a second-type control channel.

Specifically, in the present embodiment, there are at least a first-type control channel and a second-type control channel; the transmission of the first-type control channel is more robust, and the transmission efficiency of the second-type control channel is higher; and based on the design principle, a frequency band to which the sending resource allocated for the first-type control channel belongs is smaller than a frequency band to which the sending resource allocated for the second-type control channel belongs. As an implementation, the frequency band to which the sending resource allocated for the first-type control channel belongs is less than 6 GHz, and the frequency band to which the sending resource allocated for the second-type control channel belongs is more than 6 GHz.

Twentieth Embodiment

The embodiment of the disclosure also provides a method for sending control information. Based on the seventeenth embodiment, in the present embodiment, if N is more than or equal to 2, a sending resource allocated for a first-type control channel includes X1 beams/sectors/antennas/time domain symbols, and a sending resource allocated for a second-type control channel includes X2 beams/sectors/antennas/time domain symbols, X1 and X2 being positive integers, and X1 being greater than or equal to X2.

Specifically, in the present embodiment, there are at least a first-type control channel and a second-type control channel; the transmission of the first-type control channel is more robust, and the transmission efficiency of the second-type control channel is higher; and based on the design principle, a sending resource allocated for the first-type control channel includes X1 beams/sectors/antennas/time domain symbols, and a sending resource allocated for a second-type control channel includes X2 beams/sectors/antennas/time domain symbols, where X1≥X2.

Twenty-First Embodiment

The embodiment of the disclosure also provides a method for sending control information. Based on the seventeenth embodiment, in the present embodiment, if N is more than or equal to 2, a first-type control channel uses a bandwidth B1 for transmission, and a second-type control channel uses a bandwidth B2 for transmission, B1 and B2 being positive integers, and B1 being greater than or equal to B2.

Specifically, in the present embodiment, there are at least a first-type control channel and a second-type control channel; the transmission of the first-type control channel is more robust, and the transmission efficiency of the second-type control channel is higher; and based on the design principle, a sending resource allocated for the first-type control channel corresponds to a bandwidth B1, and a sending resource allocated for the second-type control channel corresponds to a bandwidth B2, where B1≥B2.

Twenty-Second Embodiment

The embodiment of the disclosure also provides a method for sending control information. Based on the seventeenth embodiment, in the present embodiment, there are at least a first-type control channel and a second-type control channel; the transmission of the first-type control channel is more robust, and the transmission efficiency of the second-type control channel is higher; and based on the design principle, if N is more than or equal to 2, a maximum aggregation level sent by the first-type control channel is greater than or equal to a maximum aggregation level sent by the second-type control channel. As an implementation, if N is equal to 2, a set of maximum aggregation levels sent by the second-type control channel is a subset of aggregation levels sent by the first-type control channel.

Twenty-Third Embodiment

Figure 18:
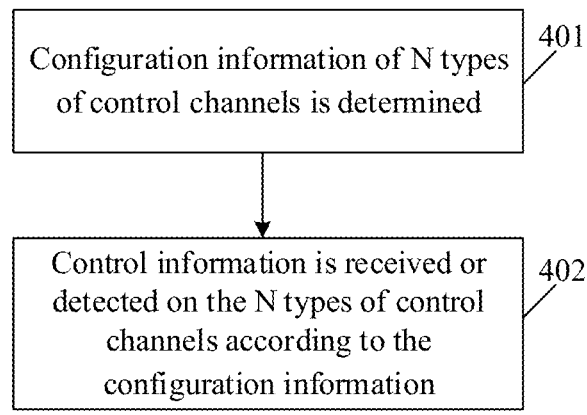
FIG. 18 is a second schematic flowchart of a method for detecting control information according to an embodiment of the disclosure.

The embodiment of the disclosure also provides a method for detecting control information. FIG. 18 is a second schematic flowchart of a control information detecting method according to an embodiment of the disclosure. As illustrated in FIG. 18, the control information detecting method includes the operations as follows.

At operation 401, configuration information of N types of control channels is determined, where N is an integer greater than or equal to 1.

At operation 402, control information is received or detected on the N types of control channels according to the configuration information.

The control information detecting method in the present embodiment is applied to a receiving end, and the receiving end may be specifically a terminal.

In the present embodiment, the terminal performs receiving/detecting on N types of control channels, and needs to determine configuration information corresponding to the N types of control channels. The configuration information includes at least one of the following parameters: parameters for sending the N types of control channels; demodulation pilot parameters of the N types of control channels; or, parameters of detections to be performed for the N types of control channels during reception of the N types of control channels. The value of each of the foregoing parameters may be a certain value or a range of values or a set of candidate values. If it is not a certain value, a receiving end needs to perform some blind detections to obtain an accurate control parameter.

In the present embodiment, the operation of determining configuration information of the N types of control channels includes: the configuration information is determined through signaling transmitted on a same carrier as that for data transmission; or, the configuration information is determined through signaling transmitted on a carrier different from that for data transmission; or, the configuration information is determined by receiving an indication of a preamble sequence.

According to the technical solution of the present embodiment, configuration information of N types of control channels is configured to make the transmission of one or more types of control channels more robust, and the transmission efficiency of other types of control channels is higher, thereby guaranteeing the robustness of a control channel adopting MIMO transmission, thereby solving the problem in the related art of severe degradation of system performance caused by overall link breaking once a beam cannot be aligned or blocked.

Twenty-Fourth Embodiment

The embodiment of the disclosure also provides a method for detecting control information. Based on the twenty-third embodiment, in the present embodiment, there are at least a first-type control channel and a second-type control channel; the transmission of the first-type control channel is more robust, and the transmission efficiency of the second-type control channel is higher, Based on the design principle, if N is more than or equal to 2, a receiving or detecting period allocated for the first-type control channel is M times of a receiving or detecting period allocated for the second-type control channel, M being a positive integer.

Twenty-Fifth Embodiment

The embodiment of the disclosure also provides a method for detecting control information. Based on the twenty-third embodiment, in the present embodiment, there are at least a first-type control channel and a second-type control channel; the transmission of the first-type control channel is more robust, and the transmission efficiency of the second-type control channel is higher. Based on the design principle, if N is more than or equal to 2, a receiving/detecting frequency band allocated for the first-type control channel is smaller than a receiving or detecting frequency band allocated for the second-type control channel. As an implementation, the receiving/detecting frequency band allocated for the first-type control channel is less than 6 GHz, and the receiving/detecting frequency band allocated for the second-type control channel is more than 6 GHz.

Twenty-Sixth Embodiment

The embodiment of the disclosure also provides a method of detecting control information. Based on the twenty-third embodiment, in the present embodiment, there are at least a first-type control channel and a second-type control channel; the transmission of the first-type control channel is more robust, and the transmission efficiency of the second-type control channel is higher. Based on the design principle, if N is more than or equal to 2, a receiving or detecting resource allocated for the first-type control channel includes X1 beams or sectors or antennas or time domain symbols, and a receiving or detecting resource allocated for the second-type control channel includes X2 beams or sectors or antennas or time domain symbols, X1 and X2 being positive integers, and X1 being greater than or equal to X2.

Twenty-Seventh Embodiment

The embodiment of the disclosure also provides a method for detecting control information. Based on the twenty-third embodiment, in the present embodiment, there are at least a first-type control channel and a second-type control channel; the transmission of the first-type control channel is more robust, and the transmission efficiency of the second-type control channel is higher; and based on the design principle, if N is more than or equal to 2, the first-type control channel uses a bandwidth B1 for receiving/detecting, and the second-type control channel uses a bandwidth B2 for receiving/detecting, B1 and B2 being positive integers, and B1 being greater than or equal to B2.

Twenty-Eighth Embodiment

The embodiment of the disclosure also provides a method for detecting control information. Based on the twenty-third embodiment, in the present embodiment, there are at least a first-type control channel and a second-type control channel; the transmission of the first-type control channel is more robust, and the transmission efficiency of the second-type control channel is higher; and based on the design principle, when N is more than or equal to 2, a maximum aggregation level received/detected by the first-type control channel is greater than or equal to a maximum aggregation level received/detected by the second-type control channel. As an implementation manner, when N is equal to 2, a set of maximum aggregation levels received/detected by the second-type control channel is a subset of a set of aggregation levels received/detected by the first-type control channel.

Twenty-Ninth Embodiment

The embodiment of the disclosure also provides a method for detecting control information. Based on the twenty-third embodiment, in the present embodiment, there are at least a first-type control channel and a second-type control channel; the transmission of the first-type control channel is more robust, and the transmission efficiency of the second-type control channel is higher; and based on the design principle, when N is more than or equal to 2, a set of time domain subframes (the time domain subframes may be specifically physical layer basic time intervals) for receiving or detecting the first-type control channel is a subset of a set of time domain subframes for receiving or detecting the second-type control channel.

In the twenty-fourth embodiment to the twenty-ninth embodiment, the terminal may determine a type of control channel according to at least one of the following modes: a time domain position, indication information of a preamble sequence, and a notification of signaling transmitted on a carrier different form that for data transmission.

Thirtieth Embodiment

Figure 19:
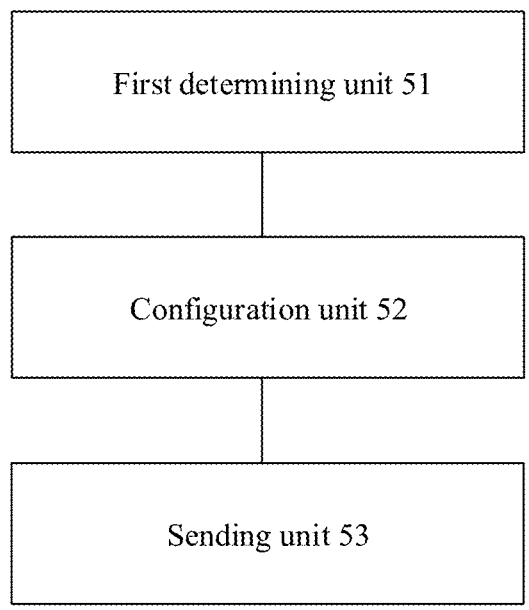
FIG. 19 is a second structure diagram of a base station according to an embodiment of the disclosure.

The embodiment of the disclosure also provides a base station corresponding to the seventeenth embodiment to the twenty-second embodiment. FIG. 19 is a second structure diagram of a base station according to an embodiment of the disclosure. As illustrated in FIG. 19, the base station includes: a first determining unit 51, a configuration unit 52 and a sending unit 53.

The first determining unit 51 is configured to determine N types of control channels, where N is an integer more than or equal to 1.

The configuration unit 52 is configured to determine configuration information of the N types of control channels.

The sending unit 53 is configured to configure the configuration information determined by the configuration unit 52 for a receiving end, and further configured to send control information through the N types of control channels.

The configuration information includes at least one of the following parameters: parameters for sending the N types of control channels; demodulation pilot parameters of the N types of control channels; or, parameters of detections to be performed for the N types of control channels during reception of the N types of control channels.

In the control information sending method of the present embodiment, the first determining unit 51 configures N types of control channels, where N is more than or equal to 1. As an implementation manner, N is equal to 2 or 3. As illustrated in FIG. 17, each type of control channel can be used for sending configuration information associated with a data channel, the transmission of the first-type control channel is more robust, and the transmission efficiency of the second-type control channel is higher, so as to guarantee the robustness of a control channel using MIMO transmission, especially in a situation where MIMO uses radio frequency precoding and baseband precoding to perform beamforming.

In the present embodiment, the configuration unit 52 determines configuration information of N types of control channels, wherein the configuration information includes at least one of the following parameters: parameters for sending the N types of control channels; demodulation pilot parameters of the N types of control channels; or, parameters of detections to be performed for the N types of control channels during reception of the N types of control channels. The value of each of the foregoing parameters may be a certain value or a range of values or a set of candidate values. If it is not a certain value, a receiving end needs to perform some blind detection to obtain an accurate control parameter.

In the present embodiment, the sending unit 53 is configured to: notify a receiving end of the configuration information through signaling transmitted on a same carrier as that for data transmission; or, notify the receiving end of the configuration information through signaling on a carrier different from that for data transmission; or, send a preamble sequence to the receiving end, and configure the configuration information for the receiving end through the preamble sequence.

In the embodiment of the disclosure, the first determining unit 51 and the configuration unit 52 in the base station may be implemented by a processor in the terminal, such as a CPU, a DSP, an MCU or an FPGA in practical applications; the sending unit 53 in the base station may be implemented through a communication module (including: a basic communication kit, an operating system, a communication module, a standardized interface, a protocol, etc.) and a transceiver antenna in practical applications.

Thirty-First Embodiment

The embodiment of the disclosure also provides a base station. Based on the thirtieth embodiment, in the present embodiment, there are at least a first-type control channel and a second-type control channel; the transmission of the first-type control channel is more robust, and the transmission efficiency of the second-type control channel is higher; and based on the design principle, as an implementation manner, when N is more than or equal to 2, a sending period allocated for the first-type control channel is M times of a sending period allocated for the second-type control channel, M being a positive integer.

As an implementation manner, when N is more than or equal to 2, a sending frequency band allocated for the first-type control channel is lower than a sending frequency band allocated for the second-type control channel.

As an implementation manner, when N is more than or equal to 2, a sending resource allocated for the first-type control channel includes X1 beams or sectors or antennas or time domain symbols, and a sending resource allocated for the second-type control channel includes X2 beams or sectors or antennas or time domain symbols, X1 and X2 being positive integers, and X1 being greater than or equal to X2.

As an implementation manner, when N is more than or equal to 2, the first-type control channel uses a bandwidth B1 for transmission, and the second-type control channel uses a bandwidth B2 for transmission, B1 and B2 being positive integers, and B1 being greater than or equal to B2.

As an implementation manner, when N is more than or equal to 2, a maximum aggregation level sent by the first-type control channel is greater than or equal to a maximum aggregation level sent by the second-type control channel. As an implementation manner, when N is equal to 2, a set of maximum aggregation levels sent by the second-type control channel is a subset of a set of aggregation levels sent by the first-type control channel.

Thirty-Second Embodiment

Figure 20:
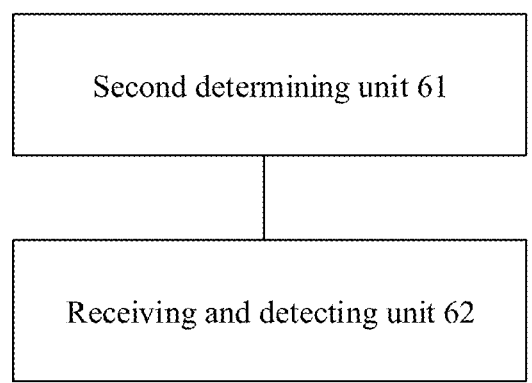
FIG. 20 is a second structure diagram of a terminal according to an embodiment of the disclosure.

The embodiment of the disclosure also provides a terminal corresponding to the twenty-third embodiment to the twenty-ninth embodiment. FIG. 20 is a second structure diagram of a terminal according to an embodiment of the disclosure. As illustrated in FIG. 20, the terminal includes: a second determining unit 61 and a receiving and detecting unit 62.

The second determining unit 61 is configured to determine configuration information of N types of control channels, where N is an integer more than or equal to 1.

The receiving and detecting unit 62 is configured to receive or detect control information on the N types of control channels according to the configuration information determined by the second determining unit 61.

In the present embodiment, the receiving and detecting unit 62 performs receiving or detecting on N types of control channels, and needs to determine configuration information corresponding to the N types of control channels. The configuration information includes at least one of the following parameters: parameters for sending the N types of control channels; demodulation pilot parameters of the N types of control channels; or, parameters of detections to be performed for the N types of control channels during reception of the N types of control channels. The value of each of the foregoing parameters may be a certain value or a range of values or a set of candidate values. If it is not a certain value, a receiving end needs to perform some blind detections to obtain an accurate control parameter.

In the present embodiment, the operation of determining, by the second determination unit 61, configuration information of the N types of control channels includes: determining the configuration information through signaling transmitted on a same carrier as that for data transmission; or, determining the configuration information through signaling transmitted on a carrier different from that for data transmission; or, determining the configuration information by receiving an indication of a preamble sequence.

Thirty-Third Embodiment

The embodiment of the disclosure also provides a method for detecting control information. Based on the thirty-second embodiment, in the present embodiment, there are at least a first-type control channel and a second-type control channel; the transmission of the first-type control channel is more robust, and the transmission efficiency of the second-type control channel is higher; and based on the design principle, as an implementation manner, when N is more than or equal to 2, a receiving or detecting period allocated for the first-type control channel is M times of a receiving or detecting period allocated for the second-type control channel, M being a positive integer.

As an implementation manner, when N is more than or equal to 2, a receiving or detecting frequency band allocated for a first-type control channel is smaller than a receiving or detecting frequency band allocated for a second-type control channel. As an implementation manner, the receiving or detecting frequency band allocated for the first-type control channel is less than 6 GHz, and the receiving or detecting frequency band allocated for the second-type control channel is more than 6 GHz.

As an implementation manner, when N is more than or equal to 2, a receiving or detecting resource allocated for a first-type control channel includes X1 beams or sectors or antennas or time domain symbols, and a receiving or detecting resource allocated for a second-type control channel includes X2 beams or sectors or antennas or time domain symbols, X1 and X2 being positive integers, and X1 being greater than or equal to X2.

As an implementation manner, when N is more than or equal to 2, the first-type control channel uses a bandwidth B1 for receiving or detecting, and the second-type control channel uses a bandwidth B2 for receiving or detecting, B1 and B2 being positive integers, and B1 being greater than or equal to B2.

As an implementation manner, when N is more than or equal to 2, a maximum aggregation level received or detected by the first-type control channel is greater than or equal to a maximum aggregation level received or detected by the second-type control channel. As an implementation manner, when N is equal to 2, a set of maximum aggregation levels received or detected by the second-type control channel is a subset of a set of aggregation levels received or detected by the first-type control channel.

As an implementation manner, when N is more than or equal to 2, a set of time domain subframes (the time domain subframes may be specifically physical layer basic time intervals) received or detected by the first-type control channel is a subset of a set of time domain subframes received or detected by the second-type control channel.

In the present embodiment, the receiving and detecting unit 62 determines a control channel type according to at least one of the following modes: a time domain position, indication information of a preamble sequence, and a notification of signaling for transmitting different carriers from data.

The second determining unit 61 in the terminal according to the embodiment of the disclosure may be implemented by a processor in the terminal, such as a CPU, a DSP, an MCU or an FPGA in practical applications; the receiving and detecting unit 62 may be implemented through a communication module (including: a basic communication kit, an operating system, a communication module, a standardized interface, a protocol, etc.) and a transceiver antenna in practical applications.

In several embodiments provided by the present application, it is to be understood that the disclosed device and method may be implemented in other manners. The device embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed between various components may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be all integrated into one processing unit, or each unit may exist physically separately, or two or more units may be integrated into one unit. The integrated unit may be implemented in the form of hardware or in the form of hardware and software functional units.

Those of ordinary skill in the art can understand that all or part of the operations of implementing the above method embodiments may be completed by using hardware related to program instructions, and the foregoing program may be stored in a computer readable storage medium, and the program is executed to perform the operations in the above method embodiments. The foregoing storage medium includes various media capable of storing program codes such as a mobile storage device, a Read-Only Memory (ROM), a Random Access Memory (RAM), a magnetic disk, or an optical disc.

Or, the integrated unit in the disclosure may be stored in a computer-readable storage medium if being implemented in the form of a software function module and sold or used as a standalone product. Based on such understanding, the essence of the technical solution of the embodiments of the disclosure or a part contributing to the related art may be embodied in the form of a software product that is stored in a storage medium, including a plurality of instructions used to cause a computer device (which may be a personal computer, a server, or a network device, etc.) to perform all or part of the methods described in various embodiments of the disclosure. The foregoing storage medium includes: various media capable of storing program codes, such as a mobile storage device, a ROM, a RAM, a magnetic disk, or an optical disc.

Based on this, the embodiment of the disclosure also provides a computer storage medium. The computer storage medium includes a set of instructions, when the instructions are executed, at least one processor is triggered to perform the control information sending method according to the embodiment of the disclosure, or perform the control information detecting method according to the embodiment of the disclosure.

The above is only the specific implementation manner of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of the claims.

INDUSTRIAL APPLICABILITY

According to the solutions provided in the embodiments of the disclosure, on one hand, a base station determines first-type physical layer control information, the first-type physical layer control information being indicative of a first-type control parameter of a second-type physical layer control channel; the base station determines second-type physical layer control information, the second-type physical layer control information being indicative a second-type control parameter of a data channel; the base station sends the first-type physical layer control information; and the base station sends the second-type physical layer control information on the second-type physical layer control channel. A receiving end determines first-type physical layer control information, the first-type physical layer control information being indicative of a first-type control parameter of a second-type physical layer control channel; and the receiving end receives or detects second-type physical layer control information on the second-type physical layer control channel according to the first-type physical layer control information. By adopting the technical solution of the embodiment of the disclosure, the robustness of a control channel adopting MIMO transmission is guaranteed by adding control information (first-type physical layer control information), thereby solving the problem in the related art of severe degradation of system performance caused by overall link breaking once a beam cannot be aligned or blocked.

On the other hand, a sending end determines N types of control channels, where N is an integer more than or equal to 1; the sending end determines configuration information of the N types of control channels; the sending end configures the configuration information for the receiving end; and the sending end sends control information through the N types of control channels. The receiving end determines the configuration information of the N types of control channels, where N is an integer more than or equal to 1; and the receiving end receives or detects control information on the N types of control channels according to the configuration information. Thus, according to the technical solution of the present embodiment, configuration information of N types of control channels is configured to make the transmission of one or more types of control channels more robust, and the transmission efficiency of other types of control channels is higher, thereby guaranteeing the robustness of a control channel adopting MIMO transmission, thereby solving the problem in the related art of severe degradation of system performance caused by overall link breaking once a beam cannot be aligned or blocked.

The invention claimed is:

1. A method for sending control information, comprising:
   determining, by a base station, first-type physical layer control information, the first-type physical layer control information being indicative of a first-type control parameter of a second-type physical layer control channel;
   determining, by the base station, second-type physical layer control information, the second-type physical layer control information being indicative of a second-type control parameter of a data channel;
   sending, by the base station, the first-type physical layer control information, such that the second-type physical layer control information is received or detected on the second-type physical layer control channel according to the first-type physical layer control information; and
   sending, by the base station, the second-type physical layer control information on the second-type physical layer control channel,
   wherein sending, by the base station, the first-type physical layer control information comprises one of the following:
   sending by the base station, the first-type physical layer control information through a first-type physical layer control channel;
   sending by the base station, a preamble sequence to indicate the first-type physical layer control information; or,
   notifying by the base station, the first-type physical layer control information through other physical layer control channels.

2. The method according to claim 1, wherein the first-type control parameter comprises at least one of the following parameters:
   a parameter for sending a second-type physical layer control channel;
   a reference pilot configuration parameter of the second-type physical layer control channel; or,
   a parameter for detecting the second-type physical layer control channel during reception of the second-type physical layer control channel.

3. The method according to claim 1, wherein the second-type physical layer control information comprises at least one second-type physical layer control information block; and
   the first-type control parameter comprises at least one of the following parameters:
   a parameter indicating a number of times of repeat sending the second-type physical layer control information;
   a time interval for sending the second-type physical layer control information;
   a parameter indicating a beam for sending the second-type physical layer control information;
   a parameter indicating a sector for sending the second-type physical layer control information;
   a number of antennae for sending the second-type physical layer control information;
   a number of the second-type physical layer control information blocks;
   a sending period and a basic transmission time interval offset parameter of the second-type physical layer control information;
   a transmission technology or mode for a control channel carrying the second-type physical layer control information;
   a length of a time domain symbol carrying the second-type physical layer control information;
   a cyclic prefix of the time domain symbol carrying the second-type physical layer control information;
   a frequency or time domain guard band for the control channel carrying the second-type physical layer control information;
   a frequency domain subcarrier spacing or density of the control channel carrying the second-type physical layer control information;
   a sending power of the second-type physical layer control information; or,
   a number of transmission layers for the control channel carrying the second-type physical layer control information.

4. The method according to claim 1, wherein the first-type control parameter comprises at least one of the following parameters:
   a number of ports for a pilot;
   a multiplex mode for a pilot;
   a time or frequency density of a pilot;
   a length of a time domain symbol for a pilot;
   a cyclic prefix for sending a pilot;
   a time or frequency domain guard band for a pilot;
   a position at which a pilot is sent;
   a sending power of a pilot;
   a type of a pilot; or,
   a subcarrier spacing or density for sending a pilot.

5. The method according to claim 1, wherein the first-type control parameter comprises at least one of the following parameters:
- a parameter for indicating a receiving antenna port;
- a parameter for indicating a receiving/detecting sector range;
- a parameter indicating a number of times of receiving/detecting;
- a parameter indicating a receiving mode;
- a parameter indicating a receiving beam range;
- a parameter indicating a receiving/detecting position;
- a parameter indicating a basic detection unit of receiving/detecting;
- a resource aggregation granularity of receiving/detecting.

6. The method according to claim 1, wherein the first-type physical layer control information and the second-type physical layer control information satisfy at least one of the following conditions:
- a sending period of the first-type physical layer control information is N times of a sending period of the second-type physical layer control information, N being a natural number;
- a frequency band for sending the first-type physical layer control information is lower than a frequency band for sending the second-type physical layer control information;
- the first-type physical layer control information is sent by using X1 beams or sectors or antennas or time domain symbols, and the second-type physical layer control information is sent by using no more than X2 beams or sectors or antennas or time domain symbols, X1 and X2 being positive integers, and X1 being greater than or equal to X2; or
- the first-type physical layer control channel uses a bandwidth B1 for transmission, and the second-type physical layer control channel uses a bandwidth B2 for transmission, B1 and B2 being positive integers, and B1 being greater than or equal to B2.

7. A method for detecting control information, comprising:
- determining first-type physical layer control information, the first-type physical layer control information being indicative of a first-type control parameter of a second-type physical layer control channel; and
- receiving or detecting second-type physical layer control information on the second-type physical layer control channel according to the first-type physical layer control information, the second-type physical layer control information being indicative of a second-type control parameter of a data channel,
- wherein determining first-type physical layer control information comprises one of the following:
- receiving the first-type physical layer control information, and determining the first-type physical layer control information;
- determining the first-type physical layer control information by detecting a preamble sequence indication;
- determining the first-type physical layer control information by agreeing with a sending end about a parameter range of the first-type physical layer control information and performing blind detection within the parameter range; or,
- determining the first-type physical layer control information by receiving information of other physical layer control channels.

8. The method according to claim 7, wherein the first-type control parameter comprises at least one of the following parameters:
- a parameter for sending a second-type physical layer control channel;
- a reference pilot configuration parameter of the second-type physical layer control channel; or,
- a parameter for detecting the second-type physical layer control channel during reception of the second-type physical layer control channel.

9. The method according to claim 7, wherein the second-type physical layer control information comprises at least one second-type physical layer control information block;
the first-type control parameter comprises at least one of the following parameters:
- a parameter indicating a number of times of repeat sending the second-type physical layer control information;
- a time interval for sending the second-type physical layer control information;
- a parameter indicating a beam for sending the second-type physical layer control information;
- a parameter indicating a sector for sending the second-type physical layer control information;
- a number of antennae for sending the second-type physical layer control information;
- a number of the second-type physical layer control information blocks;
- a sending period and a basic transmission time interval offset parameter of the second-type physical layer control information;
- a transmission technology or mode for a control channel carrying the second-type physical layer control information;
- a length of a time domain symbol carrying the second-type physical layer control information;
- a cyclic prefix of the time domain symbol carrying the second-type physical layer control information;
- a frequency or time domain guard band for the control channel carrying the second-type physical layer control information;
- a frequency domain subcarrier spacing or density of the control channel carrying the second-type physical layer control information;
- a sending power of the second-type physical layer control information; or,
- a number of transmission layers for the control channel carrying the second-type physical layer control information.

10. The method according to claim 7, wherein the first-type control parameter comprises at least one of the following parameters:
- a number of ports for a pilot;
- a multiplex mode for a pilot;
- a time or frequency density of a pilot;
- a length of a time domain symbol for a pilot;
- a cyclic prefix for sending a pilot;
- a time or frequency domain guard band for a pilot;
- a position at which a pilot is sent;
- a sending power of a pilot;
- a type of a pilot; or,
- a subcarrier spacing or density for sending a pilot.

11. The method according to claim 7, wherein the first-type control parameter comprises at least one of the following parameters:

a parameter for indicating a receiving antenna port;
a parameter for indicating a receiving/detecting sector range;
a parameter indicating a number of times of receiving/detecting;
a parameter indicating a receiving mode;
a parameter indicating a receiving beam range;
a parameter indicating a receiving/detecting position;
a parameter indicating a basic detection unit of receiving/detecting;
a resource aggregation granularity of receiving/detecting.

12. The method according to claim 7, wherein the first-type physical layer control information and the second-type physical layer control information satisfy at least one of the following conditions:
    a receiving or detecting period of the first-type physical layer control information is N times of a receiving or detecting period of the second-type physical layer control information, N being a natural number;
    a frequency band for receiving or detecting the first-type physical layer control information is lower than a frequency band for receiving or detecting the second-type physical layer control information;
    the first-type physical layer control information is received by using X1 beams or sectors or antennas or time domain symbols, and the second-type physical layer control information is received by using no more than X2 beams or sectors or antennas or time domain symbols, X1 and X2 being positive integers, and X1 being greater than or equal to X2; and
    the first-type physical layer control channel uses a bandwidth B1 for receiving or detecting, and the second-type physical layer control channel uses a bandwidth B2 for receiving or detecting, B1 and B2 being positive integers, and B1 being greater than or equal to B2.

13. A base station, comprising: a processor and a memory storing computer-readable operation instructions, wherein when the computer-readable operation instructions in the memory are run, the processor is configured to perform the method of claim 1.

14. A terminal, comprising: a processor and a memory storing computer-readable operation instructions, wherein when the computer-readable operation instructions in the memory are run, the processor is configured to:
    determine first-type physical layer control information, the first-type physical layer control information being indicative of a first-type control parameter of a second-type physical layer control channel; and
    receive or detect second-type physical layer control information on the second-type physical layer control channel according to the determined first-type physical layer control information, the second-type physical layer control information being indicative of a second-type control parameter of a data channel,
    wherein when the computer-readable operation instructions in the memory are run, the processor is configured to: receive first-type physical layer control information to determine the first-type physical layer control information; or, determine first-type physical layer control information by detecting a preamble sequence indication; or, determine first-type physical layer control information by agreeing with a sending end about a parameter range of the first-type physical layer control information and performing blind detection within the parameter range; or, determine first-type physical layer control information by receiving information of other physical layer control channels.

15. The terminal according to claim 14, wherein the first-type control parameter comprises at least one of the following parameters:
    a parameter for sending a second-type physical layer control channel;
    a reference pilot configuration parameter of the second-type physical layer control channel;
    a parameter for detecting the second-type physical layer control channel during receiving the second-type physical layer control channel;
    a number of ports for a pilot;
    a multiplex mode for a pilot;
    a time or frequency density of a pilot;
    a length of a time domain symbol for a pilot;
    a cyclic prefix for sending a pilot;
    a time or frequency domain guard band for a pilot;
    a position at which a pilot is sent;
    a sending power of a pilot;
    a type of a pilot;
    a subcarrier spacing or density for sending a pilot;
    a parameter for indicating a receiving antenna port;
    a parameter for indicating a receiving/detecting sector range;
    a parameter indicating a number of times of receiving/detecting;
    a parameter indicating a receiving mode;
    a parameter indicating a receiving beam range;
    a parameter indicating a receiving/detecting position;
    a parameter indicating a basic detection unit of receiving/detecting; or
    a resource aggregation granularity of receiving/detecting.

16. The terminal according to claim 14, wherein the second-type physical layer control information comprises at least one second-type physical layer control information block;
    the first-type control parameter comprises at least one of the following parameters:
    a parameter indicating a number of times of repeat sending the second-type physical layer control information;
    a time interval for sending the second-type physical layer control information;
    a parameter indicating a beam for sending the second-type physical layer control information;
    a parameter indicating a sector for sending the second-type physical layer control information;
    a number of antennae for sending the second-type physical layer control information;
    a number of the second-type physical layer control information blocks;
    a sending period and a basic transmission time interval offset parameter of the second-type physical layer control information;
    a transmission technology or mode for a control channel carrying the second-type physical layer control information;
    a length of a time domain symbol carrying the second-type physical layer control information;
    a cyclic prefix of the time domain symbol carrying the second-type physical layer control information;
    a frequency or time domain guard band for the control channel carrying the second-type physical layer control information;
    a frequency domain subcarrier spacing or density of the control channel carrying the second-type physical layer control information;

a sending power of the second-type physical layer control information; or, a number of transmission layers for the control channel carrying the second-type physical layer control information.

17. The terminal according to claim 14, wherein the first-type physical layer control information and the second-type physical layer control information satisfy at least one of the following conditions:

a receiving or detecting period of the first-type physical layer control information is N times of a receiving or detecting period of the second-type physical layer control information, N being a natural number;

a frequency band for receiving or detecting the first-type physical layer control information is lower than a frequency band for receiving or detecting the second-type physical layer control information;

the first-type physical layer control information is received by using X1 beams or sectors or antennas or time domain symbols, and the second-type physical layer control information is received by using no more than X2 beams or sectors or antennas or time domain symbols, X1 and X2 being positive integers, and X1 being greater than or equal to X2; and the first-type physical layer control channel uses a bandwidth B1 for receiving or detecting, and the second-type physical layer control channel uses a bandwidth B2 for receiving or detecting, B1 and B2 being positive integers, and B1 being greater than or equal to B2.

* * * * *